United States Patent
Zhao et al.

(10) Patent No.: US 10,525,937 B2
(45) Date of Patent: Jan. 7, 2020

(54) INTEGRATED MULTI IMAGE SENSOR AND LENS WASHING NOZZLE ASSEMBLY AND METHOD FOR SIMULTANEOUSLY CLEANING A PLURALITY OF IMAGE SENSORS

(71) Applicant: dlhBOWLES, Inc., Canton, OH (US)

(72) Inventors: Chunling Zhao, Ellicott City, MD (US); Bryan Fung, Baltimore, MD (US)

(73) Assignee: DLHBOWLES, INC., Canton, OH (US)

( * ) Notice: Subject to any disclaimer, the term of this patent is extended or adjusted under 35 U.S.C. 154(b) by 264 days.

(21) Appl. No.: 15/304,428

(22) PCT Filed: Apr. 16, 2015

(86) PCT No.: PCT/US2015/026204
§ 371 (c)(1),
(2) Date: Oct. 14, 2016

(87) PCT Pub. No.: WO2015/161097
PCT Pub. Date: Oct. 22, 2015

(65) Prior Publication Data
US 2017/0036647 A1    Feb. 9, 2017

Related U.S. Application Data

(60) Provisional application No. 61/980,407, filed on Apr. 16, 2014.

(51) Int. Cl.
*B05B 1/04* (2006.01)
*B08B 3/02* (2006.01)
(Continued)

(52) U.S. Cl.
CPC ............. *B60S 1/0848* (2013.01); *B05B 1/04* (2013.01); *B08B 3/02* (2013.01); *B60R 11/04* (2013.01); *B60S 1/52* (2013.01)

(58) Field of Classification Search
CPC ... B05B 1/04; B08B 3/02; B60R 11/04; B60S 1/0848; B60S 1/52; B60S 1/56
(Continued)

(56) References Cited

U.S. PATENT DOCUMENTS 4,463,904 A    8/1984   Bray, Jr.
4,508,267 A    4/1985   Stouffer
(Continued)

FOREIGN PATENT DOCUMENTS

CN    203157944    8/2013
CN    203713824    7/2014
(Continued)

OTHER PUBLICATIONS

European Patent Office, European Search Report for EP App. No. 15 77 6160 dated Mar. 5, 2018.
(Continued)

*Primary Examiner* — Levon J Shahinian
(74) *Attorney, Agent, or Firm* — McDonald Hopkins LLC

(57) ABSTRACT

A unitary or one-piece integral image sensor and washing nozzle assembly or module 100, 300, 400 is configured to enclose, protect, and aim multiple image sensors and effectively clean multiple lenses (e.g., 102, 104) simultaneously while using only one nozzle head (e.g., 120, 320 or 420) with at least one optimized spray pattern (e.g., 122). The module includes a housing with a cover or bezel (e.g., 106) that supports and orients the lenses and the nozzle head aims spray at the lenses along a spray axis, with the relative heights and spacings of the nozzle's outlet orifice (e.g., 174) and the surfaces of the lenses (e.g., 102, 104) selected so that
(Continued)

a particular spray either glances across and washes a nearest lens (e.g., 102) or impacts and washes over a farthest lens (e.g., 104).

19 Claims, 13 Drawing Sheets

(51) Int. Cl.
*B60R 11/04* (2006.01)
*B60S 1/08* (2006.01)
*B60S 1/52* (2006.01)
*B60S 1/56* (2006.01)

(58) Field of Classification Search
USPC .............................. 134/94.1, 95.3, 123, 198
See application file for complete search history.

(56) References Cited

U.S. PATENT DOCUMENTS

| | | |
|---|---|---|
| 4,731,100 A | 3/1988 | Loeffelmann |
| 5,546,630 A | 8/1996 | Long |
| 5,550,677 A | 8/1996 | Schofield |
| 5,670,935 A | 9/1997 | Schofield |
| 5,724,187 A | 3/1998 | Varaprasad |
| 5,749,525 A | 5/1998 | Stouffer |
| 5,760,962 A | 6/1998 | Schofield |
| 5,796,094 A | 8/1998 | Schofield |
| 5,854,708 A | 12/1998 | Komatsu |
| 5,877,897 A | 3/1999 | Schofield |
| 5,949,331 A | 9/1999 | Schofield |
| 6,013,372 A | 1/2000 | Hayakawa |
| 6,071,606 A | 6/2000 | Yamazaki |
| 6,097,023 A | 8/2000 | Schofield |
| 6,189,808 B1 | 2/2001 | Daniels |
| 6,193,378 B1 | 2/2001 | Tonar |
| 6,201,642 B1 | 3/2001 | Bos |
| 6,222,447 B1 | 4/2001 | Schofield |
| 6,253,782 B1 | 7/2001 | Raghu |
| 6,257,500 B1 | 7/2001 | Petzold |
| 6,302,545 B1 | 10/2001 | Schofield |
| 6,396,397 B1 | 5/2002 | Bos |
| 6,498,620 B2 | 12/2002 | Schofield |
| 6,523,964 B2 | 2/2003 | Schofield |
| RE38,013 E | 3/2003 | Stouffer |
| 6,554,210 B2 | 4/2003 | Holt |
| 6,611,202 B2 | 8/2003 | Schofield |
| 6,626,377 B1 | 9/2003 | Vogt |
| 6,690,268 B2 | 2/2004 | Schofield |
| 6,708,899 B2 | 3/2004 | Nakano |
| 6,717,610 B1 | 4/2004 | Bos |
| 6,757,109 B2 | 6/2004 | Bos |
| 6,834,904 B2 | 12/2004 | Sauvonnet |
| 6,834,906 B2 | 12/2004 | Vaitus |
| 7,005,974 B2 | 2/2006 | McMahon |
| 7,014,131 B2 | 3/2006 | Berning |
| 7,038,577 B2 | 5/2006 | Pawlicki |
| 7,267,290 B2 | 9/2007 | Gopalan |
| 7,339,149 B1 | 3/2008 | Schofield |
| 7,506,823 B2 | 3/2009 | Eisele |
| 7,563,505 B2 | 7/2009 | Reihs |
| 7,726,821 B2 | 6/2010 | Bral |
| 7,965,336 B2 | 6/2011 | Bingle |
| 7,982,767 B2 | 7/2011 | Berson |
| 8,149,327 B2 | 4/2012 | Lin |
| 8,186,608 B2 | 5/2012 | Rathey |
| 8,454,245 B2 | 6/2013 | Overskeid |
| 8,567,963 B1 | 10/2013 | Criscuolo |
| 8,671,504 B2 | 3/2014 | Ono |
| 8,792,003 B2 | 7/2014 | Nakamura |
| 8,985,480 B2 | 3/2015 | Kikuta |
| 9,126,534 B2 | 9/2015 | Snider |
| 9,180,840 B2 | 11/2015 | Tanaka |
| 9,217,864 B2 | 12/2015 | Bell |
| 9,221,430 B2 | 12/2015 | Kikuta |
| 9,278,670 B2 | 3/2016 | Hattori |
| 9,319,637 B2 | 4/2016 | Lu |
| 9,452,739 B2 | 9/2016 | Kikuta |
| 9,454,003 B1 | 9/2016 | Li |
| 9,464,982 B2 | 10/2016 | Tokhtuev |
| 9,505,382 B2 | 11/2016 | Gokan |
| 9,538,054 B2 | 1/2017 | Hayakawa |
| 9,539,988 B2 | 1/2017 | Hsiao |
| 9,607,242 B2 | 3/2017 | Lavoie |
| 9,616,856 B2 | 4/2017 | Irie |
| 9,625,714 B2 | 4/2017 | Rousseau |
| 9,663,073 B2 | 5/2017 | Tanaka |
| 9,707,896 B2 | 7/2017 | Boegel |
| 9,746,666 B2 | 8/2017 | Eineren |
| 9,796,359 B2 | 10/2017 | Field |
| 9,796,361 B2 | 10/2017 | Gokan |
| 9,804,386 B2 | 10/2017 | Hayakawa |
| 9,862,321 B2 | 1/2018 | Henion |
| 2003/0124360 A1 | 7/2003 | Reihs |
| 2004/0164189 A1 | 8/2004 | Berning |
| 2004/0189831 A1 | 9/2004 | Shibatani |
| 2004/0200027 A1 | 10/2004 | Sugihara |
| 2005/0129394 A1 | 6/2005 | Ichikawa |
| 2006/0157591 A1 | 7/2006 | Eisele |
| 2006/0289678 A1 | 12/2006 | Sakai |
| 2007/0132610 A1 | 6/2007 | Guemalec |
| 2008/0081108 A1 | 4/2008 | Yamada |
| 2008/0210780 A1 | 9/2008 | Discher |
| 2009/0250533 A1 | 10/2009 | Akiyama |
| 2010/0230991 A1 | 9/2010 | Fioravanti |
| 2011/0061692 A1 | 3/2011 | Gopalan |
| 2011/0073142 A1 | 3/2011 | Hattori |
| 2011/0147479 A1 | 6/2011 | Overskeid |
| 2011/0266375 A1 | 11/2011 | Ono |
| 2011/0292212 A1 | 12/2011 | Tanabe |
| 2012/0117745 A1 | 5/2012 | Hattori |
| 2012/0133768 A1 | 5/2012 | Stephan |
| 2012/0162428 A1 | 6/2012 | Wee |
| 2012/0266922 A1 | 10/2012 | Krahn |
| 2013/0092758 A1 | 4/2013 | Tanaka |
| 2013/0142026 A1 | 6/2013 | Matsumura |
| 2013/0146577 A1 | 6/2013 | Haig |
| 2013/0209079 A1 | 8/2013 | Alexander |
| 2013/0255023 A1 | 10/2013 | Kikuta |
| 2013/0319486 A1 | 12/2013 | Kikuta |
| 2014/0060582 A1 | 3/2014 | Hartranft |
| 2015/0090291 A1 | 4/2015 | Na |
| 2015/0138357 A1 | 5/2015 | Romack |
| 2015/0166020 A1 | 6/2015 | Kong |
| 2015/0203077 A1 | 7/2015 | Gokan |
| 2015/0298657 A1 | 10/2015 | Kanter |
| 2015/0329083 A1 | 11/2015 | Kiyohara |
| 2015/0343999 A1 | 12/2015 | Lopez Galera |
| 2015/0353024 A1 | 12/2015 | Cooper |
| 2016/0001330 A1 | 1/2016 | Romack |
| 2016/0101735 A1 | 4/2016 | Trebouet |
| 2016/0176384 A1 | 6/2016 | Dissette |
| 2016/0264064 A1 | 9/2016 | Byrne |
| 2016/0311405 A1 | 10/2016 | Richardson |
| 2017/0021810 A1 | 1/2017 | Trebouet |
| 2017/0036647 A1 | 2/2017 | Zhao |
| 2017/0036650 A1 | 2/2017 | Hester |
| 2017/0182980 A1 | 6/2017 | Davies |
| 2017/0210304 A1 | 7/2017 | Davies |
| 2017/0225660 A1 | 8/2017 | Trebouet |
| 2017/0239693 A1 | 8/2017 | Nabavi |
| 2017/0274823 A1 | 9/2017 | Call |
| 2017/0297536 A1 | 10/2017 | Giraud |
| 2017/0297540 A1 | 10/2017 | Zhang |
| 2017/0313286 A1 | 11/2017 | Galera |
| 2017/0341597 A1 | 11/2017 | Buss |
| 2018/0015907 A1 | 1/2018 | Rice |

FOREIGN PATENT DOCUMENTS

| | | |
|---|---|---|
| CN | 204685543 | 10/2015 |
| CN | 105172754 | 12/2015 |
| CN | 105235647 | 1/2016 |

(56) References Cited

FOREIGN PATENT DOCUMENTS

| | | |
|---|---|---|
| CN | 106799367 | 6/2017 |
| CN | 206436913 | 8/2017 |
| CN | 107571807 | 1/2018 |
| CN | 206868696 | 1/2018 |
| DE | 10332939 | 2/2005 |
| DE | 102005007095 | 8/2006 |
| DE | 102005021671 | 11/2006 |
| DE | 102010007850 | 9/2010 |
| DE | 102014200097 | 7/2015 |
| DE | 112014002071 | 12/2015 |
| DE | 102014213282 | 1/2016 |
| DE | 102014017517 | 3/2016 |
| DE | 102015013203 | 3/2016 |
| DE | 102014220257 | 4/2016 |
| DE | 102016006039 | 11/2016 |
| DE | 112015001856 | 12/2016 |
| EP | 2845773 | 3/2015 |
| EP | 2930293 | 10/2015 |
| EP | 2949521 | 12/2015 |
| EP | 2955069 | 12/2015 |
| EP | 3141441 | 3/2017 |
| EP | 3169549 | 5/2017 |
| FR | 2875661 | 3/2006 |
| FR | 3027006 | 4/2016 |
| JP | S59102646 | 6/1984 |
| JP | 4202941 | 8/2005 |
| JP | 2006060425 | 3/2006 |
| JP | 2009220719 | 10/2009 |
| JP | 2012035654 | 2/2012 |
| JP | 5756349 | 1/2013 |
| JP | 6120395 | 1/2014 |
| JP | 2014201150 | 10/2014 |
| JP | 6213157 | 3/2015 |
| JP | 2015137070 | 7/2015 |
| JP | 3201779 | 12/2015 |
| JP | 2015216463 | 12/2015 |
| JP | 2016000599 | 1/2016 |
| JP | 2016009099 | 1/2016 |
| JP | 2016078688 | 5/2016 |
| JP | 2016088192 | 5/2016 |
| JP | 2016131957 | 7/2016 |
| JP | 2017105422 | 6/2017 |
| JP | 2017128188 | 7/2017 |
| JP | 2017129465 | 7/2017 |
| KR | 101704047 | 12/2012 |
| KR | 101534934 | 5/2015 |
| KR | 101813133 | 12/2017 |
| KR | 20170137359 | 12/2017 |
| WO | WO2006049622 | 5/2006 |
| WO | WO2017002877 | 1/2017 |
| WO | WO2017002878 | 1/2017 |
| WO | WO2017002879 | 1/2017 |
| WO | WO2017006818 | 1/2017 |
| WO | WO2017045832 | 3/2017 |
| WO | WO2017048126 | 3/2017 |
| WO | WO2017137277 | 8/2017 |
| WO | WO2017153476 | 9/2017 |
| WO | WO2017182224 | 10/2017 |
| WO | WO2017189219 | 11/2017 |
| WO | WO2017202562 | 11/2017 |
| WO | WO2017202625 | 11/2017 |
| WO | WO2017202691 | 11/2017 |
| WO | WO2017217161 | 12/2017 |
| WO | WO2017220584 | 12/2017 |

OTHER PUBLICATIONS

European Patent Office, Communication Under Rule 71(3) EPC for EP App. No. 15 780 708.2 dated Sep. 21, 2018.

International Searching Authority, U.S. Patent Office, International Search Report and Written Opinion for International App. No. PCT/US2015/025489 dated Jul. 16, 2015.

International Searching Authority, U.S. Patent Office, International Search Report and Written Opinion for International App. No. PCT/US2015/026204 dated Aug. 10, 2015.

International Searching Authority, U.S. Patent Office, International Search Report and Written Opinion for International App. No. PCT/US2012/028828 dated Jun. 22, 2012.

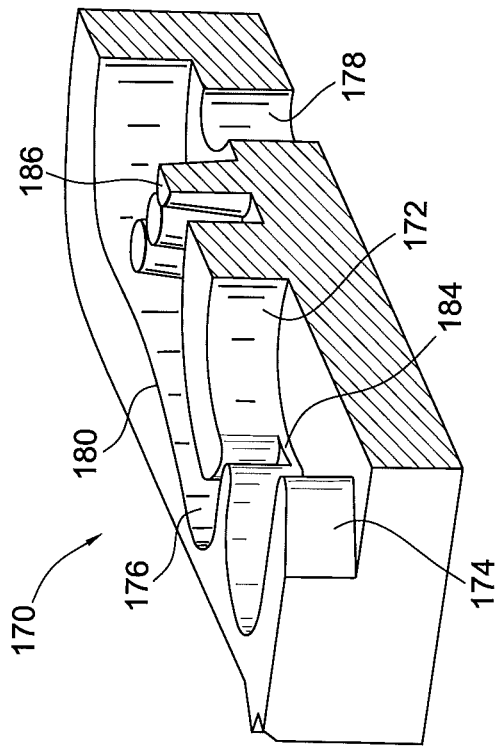
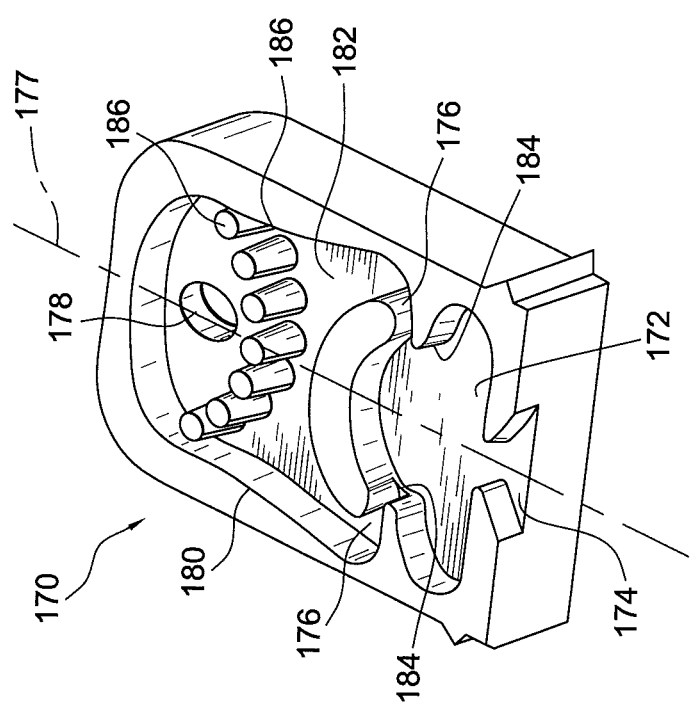
FIG. 8B
FIG. 8A

INTEGRATED MULTI IMAGE SENSOR AND LENS WASHING NOZZLE ASSEMBLY AND METHOD FOR SIMULTANEOUSLY CLEANING A PLURALITY OF IMAGE SENSORS

REFERENCE TO RELATED APPLICATIONS

This is a Continuation application which claims priority under 35 U.S.C. 120 and 35 U.S.C. 111(a) as the U.S. National Phase under 35 USC 371 of PCT/US15/26204, filed Apr. 16, 2015, published, in English, as WO2015/161097 on Oct. 22, 2015 and also claims priority benefit of U.S. Provisional Application No. 61/980,407, filed Apr. 16, 2014, the entire disclosures of which are hereby incorporated herein by reference. This application is also related to the following commonly owned patent applications on automotive camera wash systems and methods: U.S. provisional patent application No. 61/451,492 filed Mar. 10, 2011, PCT application no. PCT/US12/28828 filed Mar. 10, 2012, U.S. application Ser. No. 14/086,746, filed Sep. 10, 2013, U.S. application Ser. No. 14/086,746, filed Nov. 21 2013 and U.S. application No. 61/978,775, filed Apr. 11 2014, the entire disclosures of which are incorporated herein by reference.

BACKGROUND OF THE INVENTION

Field of the Invention

The present invention relates vehicle "backup" camera systems and to remotely controlled systems for cleaning soiled objective lenses on video cameras or sensors when mounted in a configuration that is exposed to dirty environments, and more particularly to a fluidic spray apparatus configured to controllably direct a spray onto the lenses of at least two sensors such as video cameras when mounted in a location that is exposed to environments that can cause accumulation of dirt or other debris that impairs their usefulness by a vehicle user.

Discussion of the Prior Art

The US National Highway Traffic Safety Administration ("NHTSA") has mandated that by 2018 new vehicles must include a rearview or "backup" camera system to minimize the likelihood of "backovers". A backover is a specifically-defined type of accident, in which a non-occupant of a vehicle (i.e., a pedestrian or cyclist) is struck by a vehicle moving in reverse. Automotive original equipment manufacturers ("OEMs") are thus adding external rearview cameras to all new cars. In addition, OEMs want more cameras to see into any other blind spot around a vehicle's periphery (behind, to the side, or in front) and all of these cameras necessarily include exterior lens surfaces which will eventually become soiled with road grime, mud and the like. Drivers of large vehicles such as SUVs, Vans, and trucks often find it difficult to move their vehicles from parked positions when they cannot see or know what is behind the vehicle. In addition, drivers of most vehicles often find it difficult to locate and keep track of nearby vehicles or other obstacles, as when changing lanes, and these issues along with recent developments in automatic distance and braking controls have led to the introduction of front-view, side-view and rear-view cameras by vehicle manufacturers. These image sensors allow drivers to see whether obstacles are near their vehicle by using a display screen mounted, for example, on a rear view mirror or in a navigation system screen. Increasingly, such external view (e.g., front bumper, side-view, rear-view or back-up) cameras are being added to vehicles to enhance the driver's vision and to improve safety.

The external image sensors such as those known as backup or rear view cameras are typically mounted unobtrusively, and are incorporated into existing features such as the vehicle's rear name plate. These external cameras are exposed to the vehicle's harsh environmental surroundings and are often soiled by mud, salt spray or dirt which accumulates on the lens. Accumulating dirt and debris often distort the image available to the vehicle's drivers, thus creating confusion, dissatisfaction or a safety issue due to poor judgment by relying on an unclear picture.

The advent of low cost, reliable imaging devices using solid-state sensor technologies (e.g., CMOS pixel sensor technology), combined with an improved cost/performance ratio for video displays capable of meeting automotive specifications, and an increasing application rate of video monitor displays for automotive navigation systems and the like, has led to an increasing use of cameras or imaging sensors designed to give the driver a view of areas around the vehicle which are not in the normal direct field of view of the driver, typically referred to as "blind spots". These areas include the region close to the front of the vehicle, typically obscured by the forward structure of the vehicle, the region along the passenger side of the vehicle, the region along the driver's side of the vehicle rearward of the driver, and the area or region immediately rearward of the vehicle which cannot be seen directly or indirectly through the vehicle's mirror system. The camera or imaging sensor may capture an image of the rearward (or sideward or other blind spot area) field of view, and the image may be displayed to the driver of the vehicle to assist the driver in changing lanes, backing up or reversing, or otherwise driving or maneuvering the vehicle.

The use of electronic cameras in vehicle imaging systems can significantly increase a diligent driver's knowledge of the space immediately surrounding the vehicle prior to and during low speed maneuvers, and thus contributes to the safe completion of such maneuvers. It is now well known to provide a camera or imaging sensor on a vehicle for providing an image of an exterior scene for the driver. Such a camera may be positioned within a protective housing, which may be closed about the camera or sensor and secured together via fasteners or screws or the like. For example, a metallic protective housing may be provided, such as a die cast housing of aluminum or zinc or the like. In particular, for camera sensors mounted on the exterior of a vehicle, protection against environmental effects, such as rain, snow, road splash and/or the like, and physical protection, such as against road debris, dirt, dust, and/or the like, is important. Thus, for example, in known exterior camera sensor mounts, a butyl seal, such as a hot dispensed butyl seal, or an O-ring or other sealing member or material, has been provided between the parts of the housing to assist in sealing the housing to prevent water or other contaminants from entering the housing and damaging the camera or sensor positioned therein. However, such housings typically do not provide a substantially water tight seal, and water droplets thus may enter the housing. Furthermore, any excessive vibration of the camera sensor, due to its placement (such as at the exterior of the vehicle), may lead to an undesirable instability of the image displayed to the driver of the vehicle. Also, such cameras or sensors are costly to manufacture and to implement on the vehicles.

Such vehicle vision systems often position a camera or imaging sensor at an exterior portion of a vehicle to capture an image of an exterior scene. The cameras, particularly the cameras for rearward vision systems, are thus typically placed or mounted in a location that tends to get a high dirt buildup on the camera and/or lens of the camera, with no easy way of cleaning the camera and/or its lens. In order to reduce the dirt or moisture buildup on the lenses of such cameras, prior art developers proposed using hydrophilic or hydrophobic coatings on the lenses. However, the use of such a coating is not typically effective due to the lack of air flow across the lens, especially within a sealed housing. It has also been proposed to use heating devices or elements to reduce moisture on the lenses, within the sealed housing. However, the use of a heated lens in such applications, while reducing condensation and misting on the lens, may promote the forming of a film on the lens due to contamination that may be present in the moisture or water. Also, the appearance of such cameras on the rearward portion of vehicles is often a problem for styling of the vehicle. See, for example, prior art U.S. Pat. No. 7,965,336 to Bingle, et al. which discloses a camera module with a plastic housing that houses an image sensor, which is operable to capture images of a scene occurring exteriorly of the vehicle. Bingle's camera housing assembly is welded together with the image sensor and associated components within enclosed the plastic housing, and includes a "breathable" ventilation portion that is at least partially permeable to water vapor to allow emission of internal water vapor substantially precluding passage of water droplets and other contaminants, and so Bingle's design seeks to minimize problems arising from fluid impacting or accumulating within the housing.

Bingle also seeks to use coated lenses to keep the objective lenses' view clear, and Bingle's housing or cover is optionally provided with an anti-wetting property via a hydrophobic coating (or stack of coatings), such as is disclosed in U.S. Pat. No. 5,724,187. Bingle notes that a hydrophobic property on the outermost surface of the cover can be achieved by a variety of means, such as by use of organic and inorganic coatings or by utilizing diamond-like carbon coatings. But Bingle and others do not propose actually taking any affirmative action to remove road debris (e.g., accumulated dirt, dust, mud, road salt or other built-up debris) apart from using such coatings or surface treatments.

Based on consumer preference and at least a perceived improved ability to extract information from the image, it is desired to present an image to the driver that is representative of the exterior scene as it would be perceived by normal human vision. It is also desirable that a vehicle's imaging devices or systems be useful in all conditions, and particularly in all weather and lighting conditions. However, it is often difficult to provide an imaging sensor which is capable of providing a clear image in poor weather, especially while driving. This is because conventional imaging systems typically have difficulty resolving scene information when the camera's objective lens is partially obstructed by accumulated debris (e.g., accumulated dirt, dust, mud, road salt or other built-up debris).

In order to have effective use of the camera-based visibility systems in all weather conditions, it is desirable to have an effective method of keeping the camera lens (or the housing surface protecting the objective lens) clean, but when driving or operating a vehicle during bad weather, drivers are especially reluctant to exit the vehicle to find and inspect the camera's lens.

U.S. Pat. No. 6,834,904 (to Vaitus et al) describes the use of a "Nozzle" "in close proximity to" a lens for a vehicle's camera or vision unit, and generally discloses the structure and method for mounting a nozzle module on a vehicle liftgate. This module includes a nozzle which receives fluid from a conduit, but, as noted in the description, cleaning of the lens may be implemented in other ways, such as hydrophobic lens coatings.

Increasingly on modern vehicles, cameras or other sensors such as infrared image sensors are incorporated to provide additional information to the driver. In some cases, both types of sensors are provided in a single location, with an infrared sensor, for example, having an exterior lens with a substantially flat surface and a camera having a shaped lens, such as a "fish-eye" lens. Many of these sensing devices can become soiled and obstructed by dirt and debris common in the driving environment, eventually causing deterioration in the efficacy of one or both sensors, possibly rendering at least one of them unusable, or providing an undesirable appearance.

It is therefore desirable to periodically wash these sensing devices to reduce or eliminate the buildup of such obstructions. However, there are restrictions which are unique to certain sensor wash applications which limit use of traditional washer nozzles. Sensors may be located on or near the vehicle centerline, in close proximity to branding badges or other cosmetically important features on the vehicle, and it is undesirable to add a visible washer nozzle in this aesthetically important area. Another restriction is that sensors may have very wide fields of view, up to or exceeding 180°, so that a traditional lens washer nozzle configuration would have to be within the sensor's field of view in order to be able to direct fluid onto the sensor surface at an angle which would provide acceptable cleaning. However, a washer nozzle located within the sensor's field of view may block a significant portion of the area the sensor would otherwise be capable of monitoring. A third restriction which affects sensor wash applications is that the sensor may frequently be located on an area of the vehicle which sees higher levels of contamination than do typical washer nozzle mounting locations, such as on the front grill or the rear lift gate. Washer nozzles in these locations may be at a higher risk of being clogged by the same material which is obscuring the sensor.

In addition, when multiple image sensors are located together, the problems are multiplied, more nozzles are needed to produce more sprays, increasing the likelihood of clogging, and increasing the risks that a nozzle assembly will obstruct the field of view of one or more image sensors. There is a need, therefore, for a convenient, effective and unobtrusive system and method for cleaning exterior objective lenses and image sensors' exterior surfaces, particularly when two or more image sensors are located in close proximity to one another.

SUMMARY OF THE INVENTION

Accordingly, it is an object of the present invention to overcome the above mentioned difficulties by providing an effective system and method for cleaning a multiple exterior objective lens surfaces or image sensor surfaces to remove accumulated debris such as dirt, dust, mud, road salt or other built-up debris.

In accordance with an exemplary embodiment of the present invention, an integrated image sensor support and lens cleaning system is configured for use on a vehicle's exterior surface. The integrated multi image sensor and lens washing nozzle assembly of the present invention has a bezel or housing fixture which aims a spray nozzle assembly that is configured to spray a cleaning fluid toward and onto adjacent external lens or sensor surfaces which are exposed to the elements and apt to become soiled with debris. In a preferred form of the invention, the nozzle assembly is configured to be supported and aimed toward at least two external lenses arranged side-by-side on a common surface such as a sensor housing or bezel. The aiming fixture is also mounted on the housing to form an integral sensor and nozzle assembly having at least one fluid spray washing nozzle head which is laterally offset from, and is configured to spray washing fluid toward, two external lenses or sensor surfaces, spraying at a selected shallow, glancing spray aiming angle wash both lens surfaces simultaneously. Three configurations are shown and described, and in the first embodiment, the nozzle head sprays onto to the surface of a nearest lens, and at an angle to also impinge upon a farthest lenses surface, to wash the external surfaces of both lenses substantially simultaneously.

Optionally, this integrated image sensor lens washing assembly is configured for use with a remote control method for cleaning the two or more exterior objective lens surfaces simultaneously. The device is packaged as a unitary module which integrates a sealed image sensor housing having a pair of sensors and including an integral, remotely controllable lens cleaning system with an optimized configuration for aiming one or more cleansing sprays from laterally offset fluidic oscillators in a spray nozzle assembly.

In another preferred form of the invention, the integrated automotive sensor washer system of the present invention provides an image sensor housing assembly including an integral, remotely controllable lens cleaning system with an optimized configuration of one or more aimed cleaning sprays from selected fluidic oscillators to clean two or more exterior transparent objective lens surfaces simultaneously to safely and quickly remove accumulated debris and minimize the likelihood that vision obstructing debris or washer fluid droplets remain in the camera's field of view. The method of this embodiment of the invention enables a vehicle driver to determine when to clean a soiled external-view camera's objective lens, so the driver can ensure that the lens is adequately cleaned of accumulated debris before moving.

In a preferred embodiment of the lens cleaning system of the present invention, low flow rate fluidic circuit nozzles are configured and aimed in a manner which uses very little washing fluid. As a result, integrating the system of the present invention in a vehicle uses less washing fluid from the vehicle's washer fluid bottle and provides bottle-cleanings savings, conservation of fluid, and conservation of pressure. Conservation of washer fluid pressure is especially important when the camera lens cleaning system is integrated into an existing vehicle design's front wash system, where the camera lens washing system must function without detrimentally affecting front glass cleaning, especially under dynamic driving conditions, where the front glass cleaning system's performance is highly sensitive to fluid pressure. The system and method of the present invention is not limited to use with low flow rate nozzles exclusively, however.

Applicants have prototyped a relatively high flow rate nozzle assembly on an exemplary system and it works well, although the camera's image is somewhat compromised when actually spraying fluid and washing. It appears that the low flow rate is best accomplished thru a selected fluidic circuit geometry which allows washing fluid, since droplet size should remain larger when compared to a shear nozzle. In a preferred prototype, the fluidic circuit's features are symmetrically defined about an axis of symmetry or fluidic axis centered on the fluidic's outlet or spray orifice and the fluidic's axis is aimed by the nozzle head to be substantially coaxial with the spray axis.

Applicants' prototype development work has revealed that the lens washing nozzle configuration and aiming orientation of the present invention presents a surprisingly effective and evenly distributed oscillating spray pattern with the following benefits:

(a) It allows for nearly flush mounting with respect to the plane of each camera's distal or objective lens surface, which means a camera-plus-washer package or assembly does not get longer and interfere, or interfere as much, with camera viewing angles as a directed impact nozzle configuration would; and (b) it can be packaged to keep the overall width of the camera-plus-washer package from growing wider and larger. Previously, wider or larger diameter bug-eye lenses would likely need to have a nozzle spray originate from beyond the objective lens surface, angled back toward that lens surface, and pushed away from the lenses central axis or center line to avoid having the nozzle spray orifice being seen within the camera's field of view, which would result in a wider and longer package.

The applicants have discovered that directly spraying at a narrow, glancing angle nearly parallel to the external surface of an objective lens assembly results in less washer fluid or water remaining on the lens after conclusion of spraying and prevents water droplets from forming and remaining on the lens and obstructing the view after washing. In prototype development experiments, a more nearly on-lens axis or direct impingement spray method was discovered to leave view-obstructing droplets behind.

Broadly speaking, the integrated automotive system and nozzle assembly of the present invention is configured for use with a remote control method for cleaning an exterior objective lens surface includes a sealed image sensor housing assembly including an integral, remotely controllable lens cleaning system with an optimized configuration for aiming one or more cleansing sprays from selected fluidic oscillators at the housing's transparent objective lens protective cover.

For wide angle cameras and sensors, a compact, low profile nozzle assembly has a washer nozzle positioned to reduce or eliminate field of view issues and to allow the nozzle orifice to be shielded from contamination which might otherwise clog it. Additionally the nozzle may be integrated into a cap or other housing feature which effectively hides the nozzle and allows it to be placed in a cosmetically important area without negatively affecting aesthetics. When activated, the nozzle projects washing fluid over a wide fan angle at an acceptable spray angle of incidence to allow efficient and effective cleaning of the sensor, minimizing the use of washer fluid.

For the washer system of the present invention, a driver, user or operator views the image generated by the external camera or image sensor on an interior video display and decides whether and when to clean the external camera's objective lens or lens cover's surface to remove accumulated debris. An interior remote actuation control input (e.g., button or momentary contact switch) is provided within the operator's easy reach for convenient use in cleaning the lens, and the operator actuates the system and causes the cleansing spray to begin while viewing the image sensor's output on the video display, stopping actuation of the system when the operator deems the image sensor's view to be satisfactory.

Briefly, then, in accordance with the invention, an automotive system is provided that incorporates multiple image sensors aligned side-by-side on a substantially planar housing or bezel surface, wherein each sensor includes a lens having a surface to be cleaned. The improvement described in a preferred embodiment of the invention includes a single fluidic nozzle assembly mounted on the surface to one side of, or transversely to, multiple sensors, the nozzle assembly incorporating a spray head having at least one fluid outlet nozzle having an aperture for directing a controlled fluid spray outwardly toward and across all of said sensor lenses. The nozzle assembly is mounted with its fluid outlet aperture oriented at a very small height above the nearest lens surface and spaced laterally from that surface to cause the fluid spray to be ejected from the spray head in a direction to strike the lenses substantially simultaneously at angles selected to produce fluid effects at the lenses that enhance the cleaning effect of the fluid on the lenses.

In one embodiment, a first fluid nozzle aperture or outlet orifice and the multiple lenses are aligned along a common spray axis, so that fluid ejected from the nozzle's outlet orifice or aperture grazes across a first lens nearest to the aperture and impacts a second lens spaced farthest away from the aperture. The shape and orientation of the fluid spray and the shape and spacing of the lenses are selected together so that the fluid spray from the nozzle aperture produces fluid effects at each lens surface to enhance cleaning of the lenses. The spray head in an alternative embodiment may incorporate first and second fluid outlet apertures, each outlet aperture being aimed to direct a selected spray pattern toward a selected lens.

Another aspect of the invention includes a method for simultaneously cleaning the exterior surfaces of multiple image sensor lenses, including mounting at least first and second image sensors side by side on a common housing and aligned along an axis, wherein the sensors each have an exterior lens surface; mounting a single fluidic nozzle assembly on the housing to one side of the first and second sensors; incorporating a fluidic spray head having at least one fluid outlet nozzle in the assembly, the spray head having an aperture for directing a controlled fluid spray outwardly; aligning the nozzle assembly spray head aperture or orifice along the axis to direct spray toward and against the sensor lenses; and configuring the sensor lenses and the nozzle assembly to provide selected relative heights and spacings of the sensor lens surfaces and the fluidic spray head aperture to cause fluid spray from the nozzle assembly to graze a nearest image sensor lens and to impact a farthest image sensor lens for enhanced cleaning of the exterior lens surfaces.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

BRIEF DESCRIPTION OF THE DRAWINGS

FIG. 8A is a perspective view of an exemplary fluidic oscillator suitable for the spray nozzle of the integrated multi image sensor and lens washing nozzle assembly of FIGS. 2-7B, illustrating the fluidic circuit's features as symmetrically defined about an axis of symmetry or fluidic axis centered on the fluidic's outlet or spray orifice, in accordance with the present invention.

FIG. 8B is a sectional view of the fluidic circuit of FIG. 8A, in accordance with the present invention.

DESCRIPTION OF THE PREFERRED EMBODIMENT

In order to provide an exemplary context and basic nomenclature, reference is made to FIGS. 1A-1D, illustrating a prior art imaging system for a vehicle and a camera module as disclosed in U.S. Pat. No. 7,965,336 (hereafter, Bingle et al). This overview will be useful for establishing nomenclature and automotive industry standard terminology, in accordance with the Prior Art.

Figure 1A:
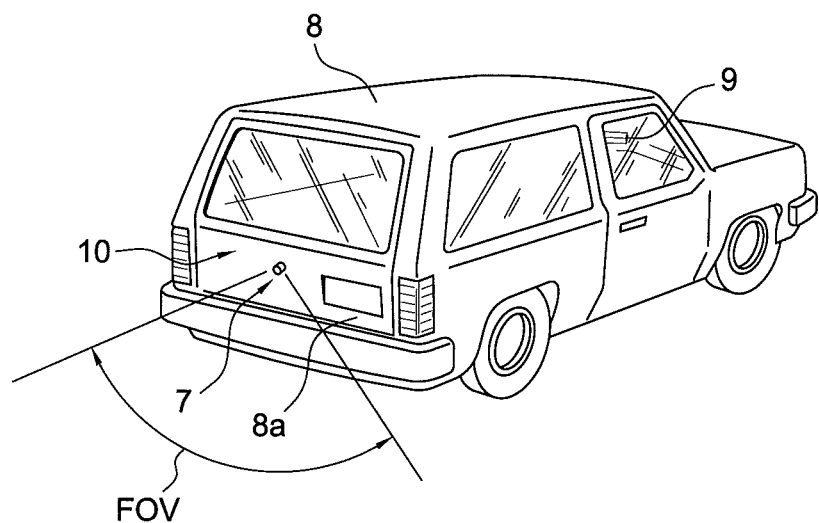
FIG. 1A, is a rear perspective view of a vehicle having an imaging system or back-up camera system as disclosed in U.S. Pat. No. 7,965,336 (to Bingle et al), in accordance with the Prior Art.
Figure 1B:
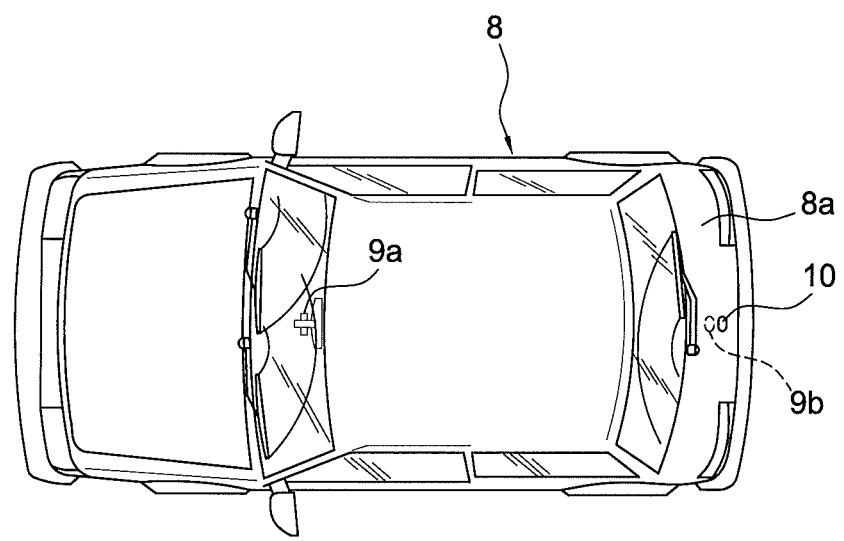
FIG. 1B is a plan view of the vehicle of FIG. 1A.

Referring now to FIGS. 1A-1D, an image capture system or imaging or vision system 7 is positioned at a vehicle 8, such as at a rearward exterior portion 8a of the vehicle 8, and is operable to capture an image of a scene occurring interiorly or exteriorly of the vehicle, such as rearwardly of the vehicle, and to display the image at a display or display system 9a of the vehicle which is viewable by a driver or occupant of the vehicle (see, e.g., FIGS. 1A and 1B). Imaging system 7 includes a camera module 10, which is mountable on, at or in the vehicle to receive an image of a scene occurring exteriorly or interiorly of the vehicle, and a control 9b that is operable to process images captured by an image sensor 18 of camera module 10. Camera module 10 includes a plastic camera housing 11 and a metallic protective shield or casing 16 (see FIGS. 1C & 1D).

Camera housing 11 includes a camera housing portion 12 and a connector portion 14, which mate or join together and are preferably laser welded or sonic welded together to substantially seal the housing 11 to substantially limit or prevent water intrusion or other contaminants from entering the housing, as discussed below.

Housing 11 of camera module 10 substantially encases a camera or image sensor or sensing device 18 (FIGS. 1C and 1D), which is operable to capture an image of the scene occurring exteriorly or interiorly of the vehicle, depending on the particular application of camera module 10. Housing 11 also includes a cover portion 20 at an end of camera housing portion 12. Cover portion 20 provides a transparent cover plate 22 which allows the image of the scene exteriorly or interiorly of the vehicle to be detected by camera image sensor 18. Camera module 10 may include the protective shield 16, which substantially encases camera housing portion 12 and a portion of connector portion 14, thereby substantially limiting or reducing electronic noise going into or out of the camera module and/or protecting the plastic housing 11 from damage due to impact with various items of debris that may be encountered at the exterior of the vehicle.

The image captured by sensor 18 is communicated to the display or display system 9a which is operable to display the image to a driver of the vehicle. The camera or imaging sensor 18 may comprise an imaging array sensor, such as a CMOS sensor or a CCD sensor or the like, such as disclosed in U.S. Pat. Nos. 5,550,677; 5,670,935; 5,796,094; 6,097,023, and 7,339,149. Camera module 10 and imaging sensor 18 may be implemented and operated in connection with various vehicular vision systems, and/or may be operable utilizing the principles of such other vehicular systems, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; and 6,201,642, and/or a trailer hitching aid or tow check system, such as the type disclosed in U.S. Pat. No. 7,005,974, a reverse or sideward imaging system, such as for a lane change assistance system or lane departure warning system, such as the type disclosed in U.S. Pat. No. 7,038,577, a system for determining a distance to a leading or trailing vehicle or object, such as a system utilizing the principles disclosed in U.S. Pat. No. 6,396,397 or the like.

For example, the camera or sensor may comprise an LM9618 Monochrome CMOS Image Sensor or an LM9628 Color CMOS Image Sensor, both of which are commercially available from National Semiconductor. Other suitable cameras or sensors from other vendors (e.g., Sony®, Panasonic®, Magna™ and others) may be implemented with the camera module.

Although shown at a rear portion 8a of vehicle 8, camera 18 and camera module 10 may be positioned at any suitable location on vehicle 8, such as within a rear panel or portion of the vehicle, a side panel or portion of the vehicle, a license plate mounting area of the vehicle, an exterior mirror assembly of the vehicle, an interior rearview mirror assembly of the vehicle or any other location where the camera may be positioned and oriented to provide the desired view of a scene occurring exteriorly or interiorly of the vehicle. The camera module 10 is particularly suited for use as an exterior camera module. The image captured by the camera may be displayed at a display screen or the like positioned within the cabin of the vehicle, such as at an interior rearview mirror assembly (as disclosed, for example, in U.S. Pat. No. 6,690,268), or elsewhere at or within the vehicle cabin, such as by using the principles disclosed in U.S. Pat. Nos. 5,550,677; 5,670,935; 5,796,094; 6,097,023 and 6,201,642, and/or U.S. Pat. No. 6,717,610.

Figure 1C:
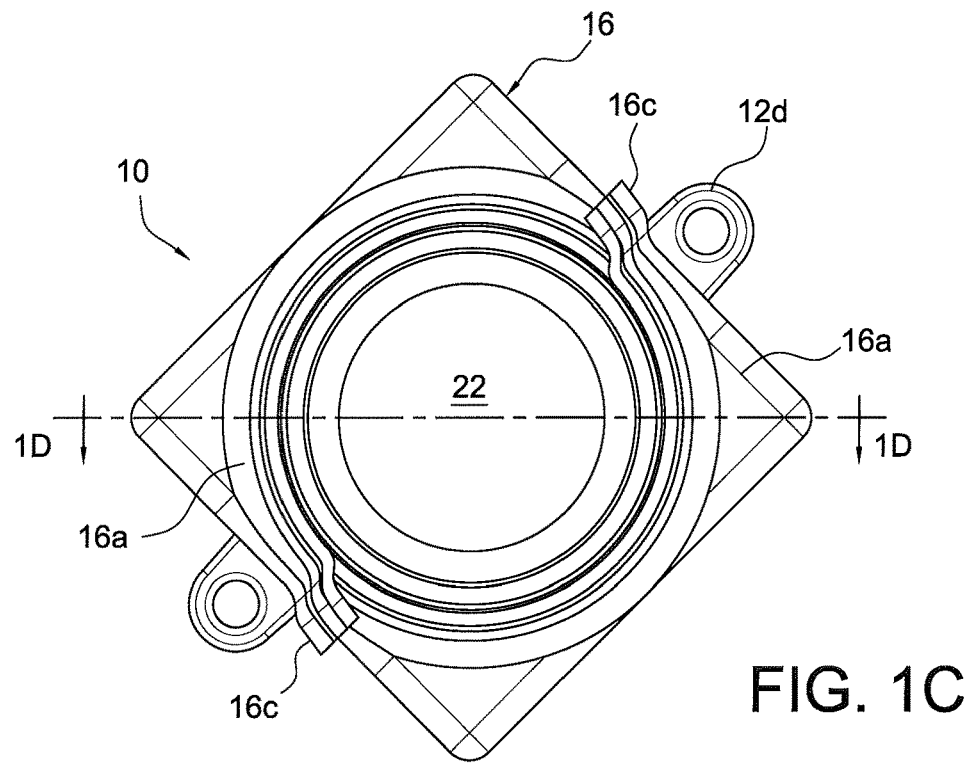
FIG. 1C is an end elevation of a sealed solid-state image sensor or camera module as disclosed in U.S. Pat. No. 7,965,336, in accordance with the Prior Art.
Figure 1D:
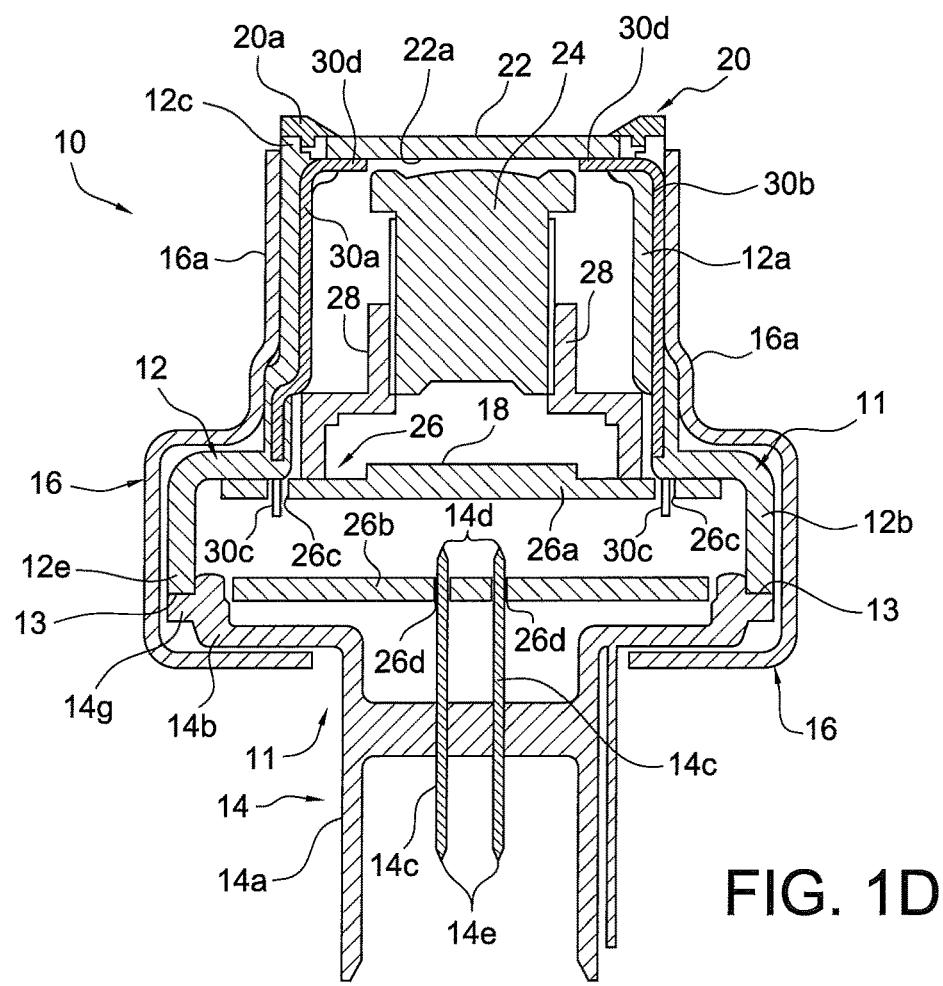
FIG. 1D is a sectional view of the camera module of FIG. 1C, taken along the line 1D-1D of FIG. 1C.

As best shown in FIGS. 1C and 1D, camera housing portion 12 of the Bingle et al patent includes a generally cylindrical portion 12a extending outwardly from a base portion 12b. Portion 12 comprises a molded plastic component and may include a pair of heater terminals or elements 30a, 30b insert molded within and/or along the walls of cylindrical portion 12a. Cylindrical portion 12A receives a lens or optic system 24, which functions to focus the image onto camera or sensor 18, which is positioned at a circuit board 26 mounted within the base portion 12B of camera housing portion 12.

Lens system 24 is positioned within cylindrical portion 12a of camera portion 12 to receive light from the exterior or interior scene through cover 22 at end 12c of camera portion 12. The lens system is mounted, as via a threaded engagement, to camera cover or housing 28, which functions to substantially cover or encase camera or sensor 18 to substantially prevent or limit incident light from being received by camera 18 and interfering with the image received by camera 18 through cover 22 and lens system 24. The lens system 24 may be any small lens or lens system which will focus an image of an exterior scene onto the camera or image sensor 18, such as, for example, the types disclosed in U.S. Pat. No. 6,201,642 or 6,757,109. The lens system 24 may provide a wide-angle field of view (FOV), for example approximately 120 degrees or more, as shown in FIG. 1A.

Cover portion 20 is mounted at an outer end 12c of camera housing portion 12 opposite from base portion 12b, as shown in FIGS. 1C and 1D. Cover portion 20 includes an outer circumferential ring or cover retainer 20a, which engages an outer surface of transparent cover 22 and functions to retain transparent cover 22 in position at the end 12c of the cylindrical portion 12a of camera receiving portion 12. Preferably, circumferential ring 20a is laser welded or sonic welded or otherwise joined or bonded to outer end 12c of cylindrical portion 12a of camera receiving portion 12 to substantially seal and secures cover portion 20 onto camera receiving portion 12, to limit or substantially preclude water intrusion or contaminant intrusion into the camera receiving portion at the outer end 12c.

As illustrated, base portion 12b is generally square and defines a generally square mating edge 12e around the base portion 12b for mating and securing to a corresponding edge 14g of connector portion 14 at joint 13. Base portion 12b receives circuit board 26 and camera 18 therein, while a camera housing or shield 28 and lens or lens system 24 extend into cylindrical portion 12a of camera portion 12 to receive the image through transparent cover 22.

Connector portion 14 of housing 11 is a molded plastic component and includes a connector terminal or connector 14a, such as a multi-pin snap-on connector or the like, extending from a base portion 14b. Base portion 14b is formed (such as in a square shape as shown in the illustrated embodiment) to substantially and uniformly mate or connect to base portion 12b of camera housing 12, as can be seen with reference to FIGS. 1C and 1D. The base portions 12b and 14b mate together and define a pocket or space for receiving and securing circuit board 26. Base portions 14b and 12b may be laser welded or sonic welded together at their mating joint or connection 13. Laser or sonic welding of the joint melts the plastic edges or seams together to substantially hermetically seal housing 11 to prevent water intrusion or other contaminant intrusion into housing 11 of camera module 10. Optionally, and less desirably, the base portions may be otherwise joined or substantially sealed together (such as via suitable adhesives and/or sealants). The module may optionally include a vented portion or semipermeable membrane to vent the module's interior. The base portions 12b and 14b may further include mounting tabs or flanges 12d, which extend outwardly from base portion 12b. Mounting tabs 12d are generally aligned with one another when the base portions are secured together and include an aperture therethrough for mounting the camera module 10 at or to the vehicle 8 via suitable fasteners or the like (not shown). Although shown as having generally square-shaped mating portions, connector portion 14 and camera portion 12 may have other shaped mating portions or surfaces.

Multi-pin connector 14a extends from base portion 14b and includes a plurality of pins or terminals 14c for electrically connecting camera module 10 with a connector (not shown) connected with the wiring harness or cables of the vehicle. For example, one end 14d of terminals 14c may connect to circuit board 26, while the other end 14e of terminals 14c connects to the corresponding connector of the vehicle. The corresponding connector may partially receive the ends 14e of pins or terminals 14c at multi-pin connector 14a and may snap together with multi-pin connector 14a via a snap connection or the like. As best shown in FIG. 1D, ends 14d of terminals 14c protrude or extend from connector portion 14, such that the ends 14d may be received within corresponding openings or apertures 26c in circuit board 26 when housing portion 11 is assembled.

As shown in FIG. 1D, connector portion 14 may provide a generally straight multi-pin connector extending longitudinally from the base portion of the housing 11. However, other shapes of connectors, such as angled connectors or bent connectors or the like, may be implemented, depending on the particular application of the camera module.

The camera module 10 may be substantially hermetically sealed so that water intrusion into the module is limited or substantially precluded. To accomplish this, base portion 12b of camera housing portion 12 and base portion 14b of connector portion 14 are correspondingly formed so as to substantially mate or join together at a mating seam 13, whereby the portions may be laser welded or sonic welded together or otherwise joined, while cover portion 20 is also laser welded or sonic welded or otherwise secured and substantially sealed at the opposite end 12c of camera portion 12, in order to substantially seal the camera housing. Laser or sonic welding techniques are preferred so as to join the materials at a state where they are able to re-flow, either via heat, vibration or other means, so that the materials re-flow and cross-link and become a unitary part. Such joining results in a substantially hermetically sealed camera module. Additionally, the pores in the plastic as well as any voids around the insert molded pins and stampings may be sealed with a Loctite® brand sealing material or other suitable sealing material, to further limit or substantially preclude entry of water droplets and/or water vapor into the housing of the substantially sealed camera module 10.

Circuit board 26 includes a camera mounting circuit board 26a, which is connected to a connector receiving circuit board 26b via a multi-wire ribbon wire or the like (not shown). Camera mounting circuit board 26a is mounted or secured to the base portion 12b of camera portion 12, while connector circuit board 26b is mounted or secured to the base portion 14b of connector portion 14. Camera or image sensor 18 is mounted at a surface of camera circuit board 26a, and is substantially encased at circuit board 26a by camera cover 28 and lens 24 (FIGS. 1C and 1D). Camera circuit board 26a includes a pair of apertures 26c for receiving ends 30c of terminals 30a, 30b. Likewise, connector circuit board 26b includes a plurality of openings or apertures 26d for receiving ends 14d of connector terminals 14c therethrough. The ends of the pins or terminals may be soldered in place in their respective openings. After all of the connections are made, the housing may be folded to its closed position and laser welded or sonic welded together or otherwise joined or bonded together to substantially seal the circuit board within the housing.

The exterior surface of cover 22 (which may be exposed to the atmosphere exterior of the camera module) may be coated with an anti-wetting property such as via a hydrophilic coating (or stack of coatings), such as is disclosed in U.S. Pat. Nos. 6,193,378; 5,854,708; 6,071,606; and 6,013,372. Also, or otherwise, the exterior or outermost surface of cover 22 may optionally be coated with an anti-wetting property such as via a hydrophobic coating (or stack of coatings), such as is disclosed in U.S. Pat. No. 5,724,187. Such hydrophobic property on the outermost surface of the cover can be achieved by a variety of means, such as by use of organic and inorganic coatings utilizing a silicone moeity (for example, a urethane incorporating silicone moeities) or by utilizing diamond-like carbon coatings. For example, long-term stable water-repellent and oil-repellent ultra-hydrophobic coatings, such as described in WIPO PCT publication Nos. WO0192179 and WO0162682, can be disposed on the exterior surface of the cover. Such ultra-hydrophobic layers comprise a nano structured surface covered with a hydrophobic agent which is supplied by an underlying replenishment layer (such as is described in Classen et al., "Towards a True 'Non-Clean' Property: Highly Durable Ultra-Hydrophobic Coating for Optical Applications", ECC 2002 "Smart Coatings" Proceedings, 2002, 181-190). For enablement and completeness of disclosure, all of the foregoing references are incorporated herein by reference.

In FIGS. 1A-1D, camera module 10 is shown to include a protective conductive shield or casing 16 which partially encases the plastic housing 11 and functions to limit or reduce electronic noise which may enter or exit camera module 10 and may protect the plastic housing from damage from impact of various items or debris which the camera module may encounter at the exterior portion of the vehicle.

The protective shield or casing 16 includes a pair of casing portions 16a (one of which is shown in FIGS. 1C and 1D). Each of the casing portions 16a partially encases about half of the plastic housing 11 of camera module 10 and partially overlaps the other of the casing portion 16a, to substantially encase the plastic housing within protective shield 16. Each of the portions 16a includes a slot 16b for receiving the mounting tabs 12d therethrough for mounting the camera module at the desired location at the vehicle. Each casing portion 16a includes overlapping portions 16c which overlap an edge of the other casing portion 16a to assemble the casing 16 around the plastic housing 11. The casing portions 16a may be welded, crimped, adhered, banded, or otherwise joined or secured together about the plastic housing 11, in order to encase the housing 11. Preferably, protective shield 16 comprises a metallic shield and contacts ground terminal 30b of heating device 30 at the exterior surface of the cylindrical portion 12a of camera receiving portion 12 and, thus, may be grounded to the heating device and/or the camera module or unit via the ground terminal 30b. Protective shield 16 may comprise a stamped metal shielding or may be formed by vacuum metalizing a shield layer over the plastic housing 11, or may comprise a foil or the like.

In accordance with the present invention, as illustrated in FIGS. 2-10, to which reference is now made, an integrated multi image sensor and lens washing nozzle assembly 100 is configured as a multi-camera (or other image sensor) module 100 for a vehicle and is provided with multiple sensors, each of which is covered by a corresponding objective lens cover or external surface such as a generally flat lens cover 102 and a dome, or "fish-eye" lens cover 104, mounted or molded in-situ in a substantially planar housing segment or bezel 106 which, in turn, is securable to a sensor enclosure or housing enclosure 108 (see FIG. 4) on or in a vehicle surface in the manner described above. The unitary module 100 of the invention further includes a nozzle assembly 110 mounted on or molded within the housing cover 106 and configured to direct a controlled fluid washer spray to clean the multiple lens covers that are also mounted in or carried on the housing's planar external surface. It will be understood that the illustrated lens covers 102 and 104 preferably are protective covers for the lenses of respective sensors mounted in the housing enclosure 108; however, in some cases the exterior surfaces of sensor lens elements may be secured in or extending above the top surface of the housing cover, as when the sensors are mounted directly to the interior of the housing's cover or bezel 106.

For convenience of reference herein, each of the objective lens or optical elements 102 and 104 may be interchangeably referred to as a lens or a lens cover. The multiple lenses or lens covers may be parts of or covers for different types of sensors, such as an infrared sensor for lens 102 and a video camera for lens 104, or the sensors may be of the same type, with different lenses providing different fields of view. In addition, although two lenses are illustrated, it will be understood that additional lenses, or lens covers, may be mounted on the housing and aligned with the two illustrated lenses for simultaneous cleaning.

The multiple lenses 102 and 104 and the nozzle assembly 110 are laterally offset from each other along the width of the substantially planar distal surface of cover or bezel 106 and are preferably aligned along a transverse axis 112 (see FIG. 3), to provide an integrated, compact sensor and lens cleaner package or unitary module 100 that meets the needs of today's vehicle designs, where more and more sensors are being used to provide drivers with enhanced visibility and to enable improved vehicle control and automation. The lens cleaner system of the invention arranges the lens and nozzle components to provide simple and effective simultaneous cleaning of multiple lenses by a single nozzle assembly by optimizing the height and spacing of the lenses or lens covers with respect to each other and with respect to the nozzle assembly to produce an efficient cleaning operation.

The laterally offset fluidic nozzle assembly 110 is located at one end of the housing cover 106, and incorporates a nozzle spray head 120 preferably including a suitable fluidic oscillator circuit, to be described. The nozzle assembly 110 is mounted on or affixed within the housing cover 106 and configured and aimed to generate a fan-shaped oscillating spray 122 to which is aimed along spray axis 112 to simultaneously clean the exterior surfaces of the lens covers 102 and 104, (see FIGS. 3, 7A and 7B). The housing 108 preferably encloses at least two image sensor units 124 and 126, which may be conventional automotive infrared or video camera sensors having lenses which correspond to and are preferably located behind protective covers or objective lens external surfaces 102 and 104, respectively. The sensor units are connected through corresponding cables 128 and 130 to suitable displays and/or controls, as is conventional in the art, to allow a vehicle's driver, user or operator to use the interior display to determine whether external-view camera objective lens surfaces or covers 102 or 104 are occluded by or covered with accumulated debris (e.g., accumulated dirt, dust, mud, road salt or other built-up debris, not shown).

Figure 3:
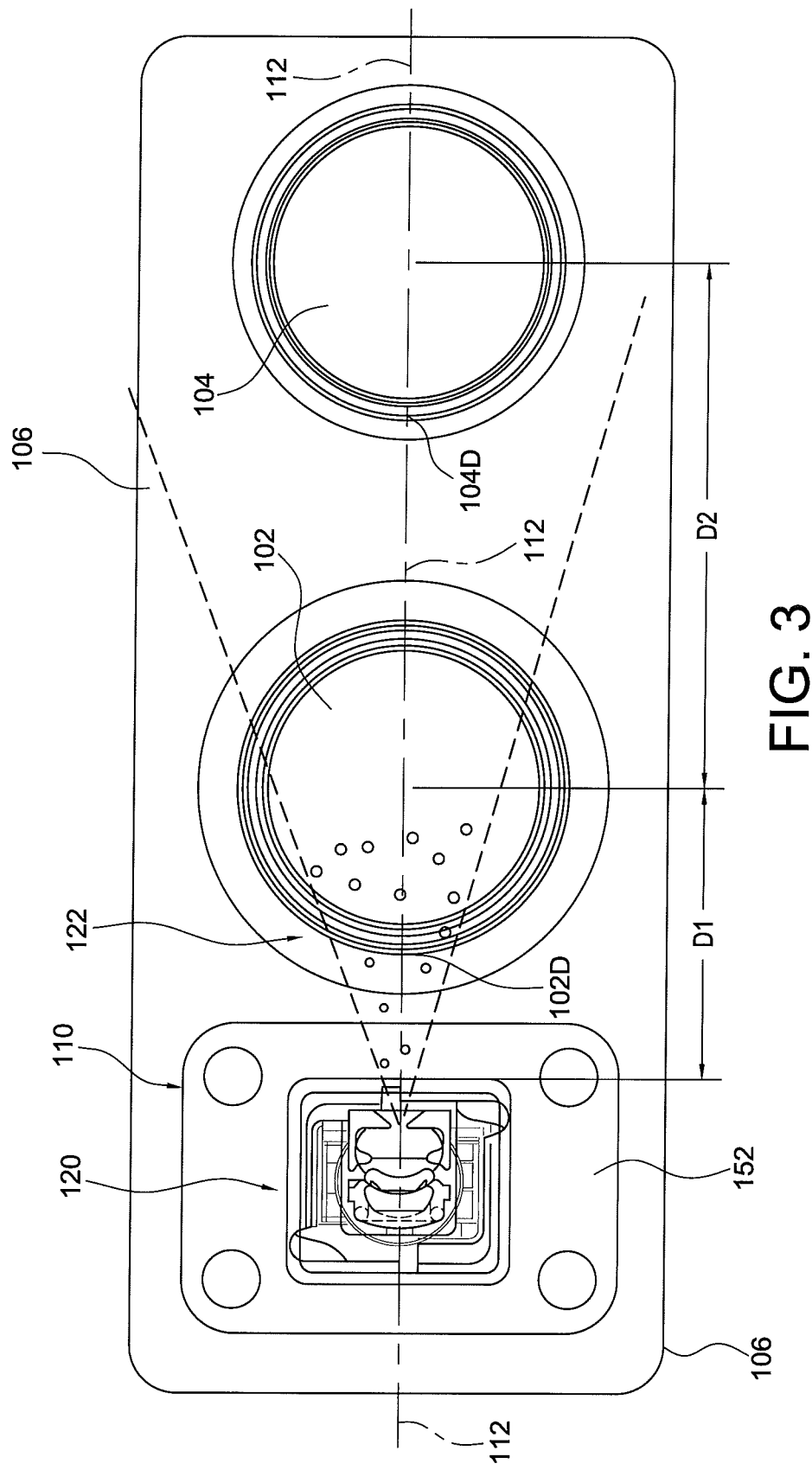
FIG. 3 is a top plan view, in elevation, of the integrated multi image sensor and lens washing nozzle assembly of FIG. 2, in accordance with the present invention.

Referring back to FIG. 3 and to FIG. 8A, nozzle spray head 120 may be configured with a cavity configured to receive fluidic circuit insert or chip 170 and provide fluid communication between inlet 178 and module inlet or barb 138. As best seen in FIGS. 3 and 8A, the fluidic circuit's features are symmetrically defined about an axis of symmetry or fluidic axis 177 centered on the fluidic's outlet or spray orifice 174 and fluidic axis 177 is oriented and aimed by nozzle head 120 to be substantially coaxial with spray axis 112.

The driver may determine from the images produced by one or both of the sensors 124 and 126 whether the external objective lens surfaces 102 and 104 are adequately cleaned before moving the vehicle. If the driver determines that cleaning is needed, a conventional spray controller is activated to deliver cleaning fluid under pressure by way of an inlet tube 138 (FIG. 6) to the spray nozzle assembly 110 and its fluidic spray nozzle head 120. It will be noted that the inlet tube 138 is connected via an elbow fitting 139, and that numerous variations in the wiring and fluid connectors may be used with the invention.

The spray nozzle head 120 located on the housing cover 106 is preferably spaced laterally far enough away from the nearest lens cover 102 and is low enough (see FIG. 5) to be entirely out of the fields of view ("FOV") of both of the image sensors, indicated by FOV lines 140 and 142 at lens covers 102 and 104, respectively, and is configured and aimed to spray cleaning fluid 122 onto both of the external objective lens cover surfaces. As illustrated, the spray 122 is directed at a low, narrow, glancing angle which is preferably nearly parallel to the external surface of the nearest relatively low and flat laterally spaced lens cover 102. Part of the spray 122 washes across the lens surface 102, while the remainder of the spray passes over lens cover 102 and impacts on the more distant lens cover 104, which is laterally spaced away from lens 102 along transverse spray axis 112 and preferably has a higher profile, such as the dome shape illustrated for lens 104 in the Figures.

Figure 7B:
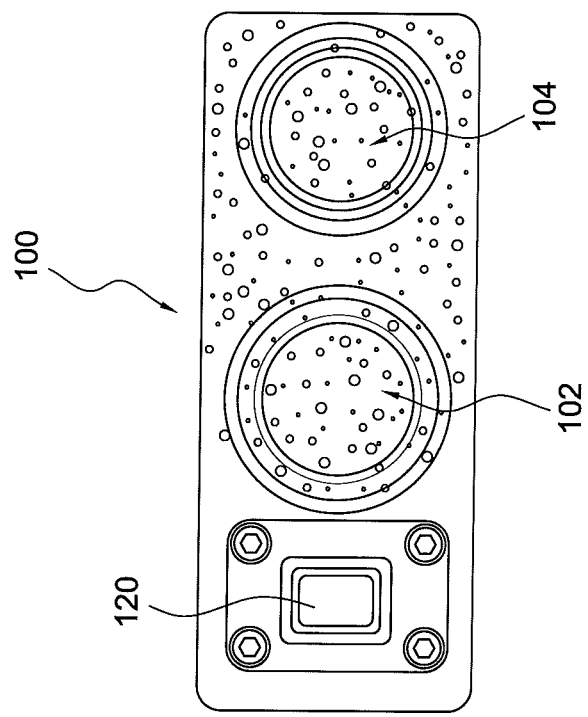
FIG. 7B is a freeze-frame photograph of the integrated multi image sensor and lens washing nozzle assembly of FIGS. 1-7A, illustrating the individual droplets of sprayed washing fluid impacting the first and second lenses, in accordance with the present invention.
Figure 7A:
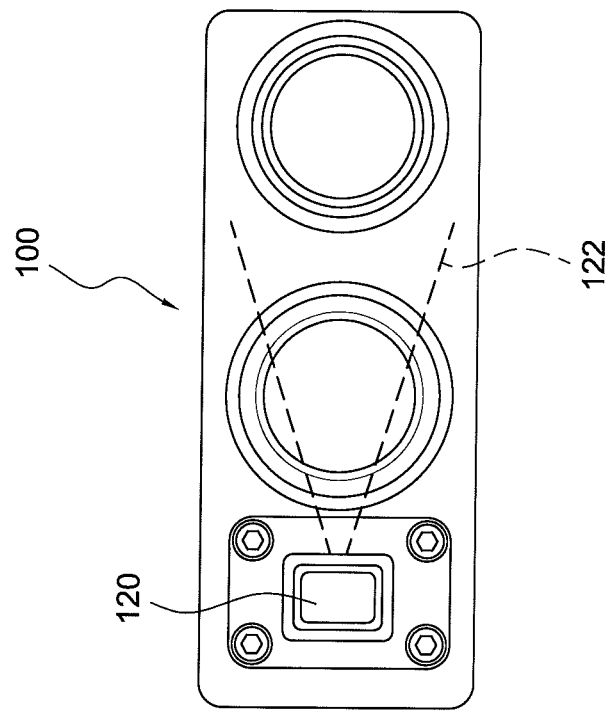
FIG. 7A is a photograph of the integrated multi image sensor and lens washing nozzle assembly of FIGS. 1-6, illustrating the nozzle assembly's spray head in operation and spraying from the outlet or spray orifice and along the spray axis, in accordance with the present invention.

The actual spray fan 122 and the droplets comprising the spray 122 are best seen in the photographs of FIGS. 7A and 7B which illustrate actual operation for a prototype of module 100, in accordance with the present invention. More particularly, FIG. 7A is a photograph of integrated multi-image sensor and lens washing spray nozzle assembly 100 illustrating that spray pattern 122 has a uniform fan shape with a fan angle which is approximately 35 degrees, symmetrically disposed about the transverse spray axis 112. As best seen in the top side view of FIG. 7A, spray 122 maintains its fan shape while washing over the nearest or first lens 102 and then continues and impacts the farther or second lens 104, which is, in the illustrated example, a "360" lens or wide FOV lens having a greater height (H3) and a more convex shape than nearer lens 102. After impacting second lens 104, the fluid attaches to the dome-shaped surface of second lens 104 and flows around the surface of lens 104. FIG. 7B is a freeze-frame photograph of the integrated multi-lens and fluidic spray nozzle assembly 100, illustrating the trajectory of individual droplets of sprayed washing fluid in spray pattern 122. Droplets are seen grazing and washing over the nearest or first lens 102 and impacting the nearest exposed dome surface of second lens 104, in accordance with the present invention.

Figure 2:
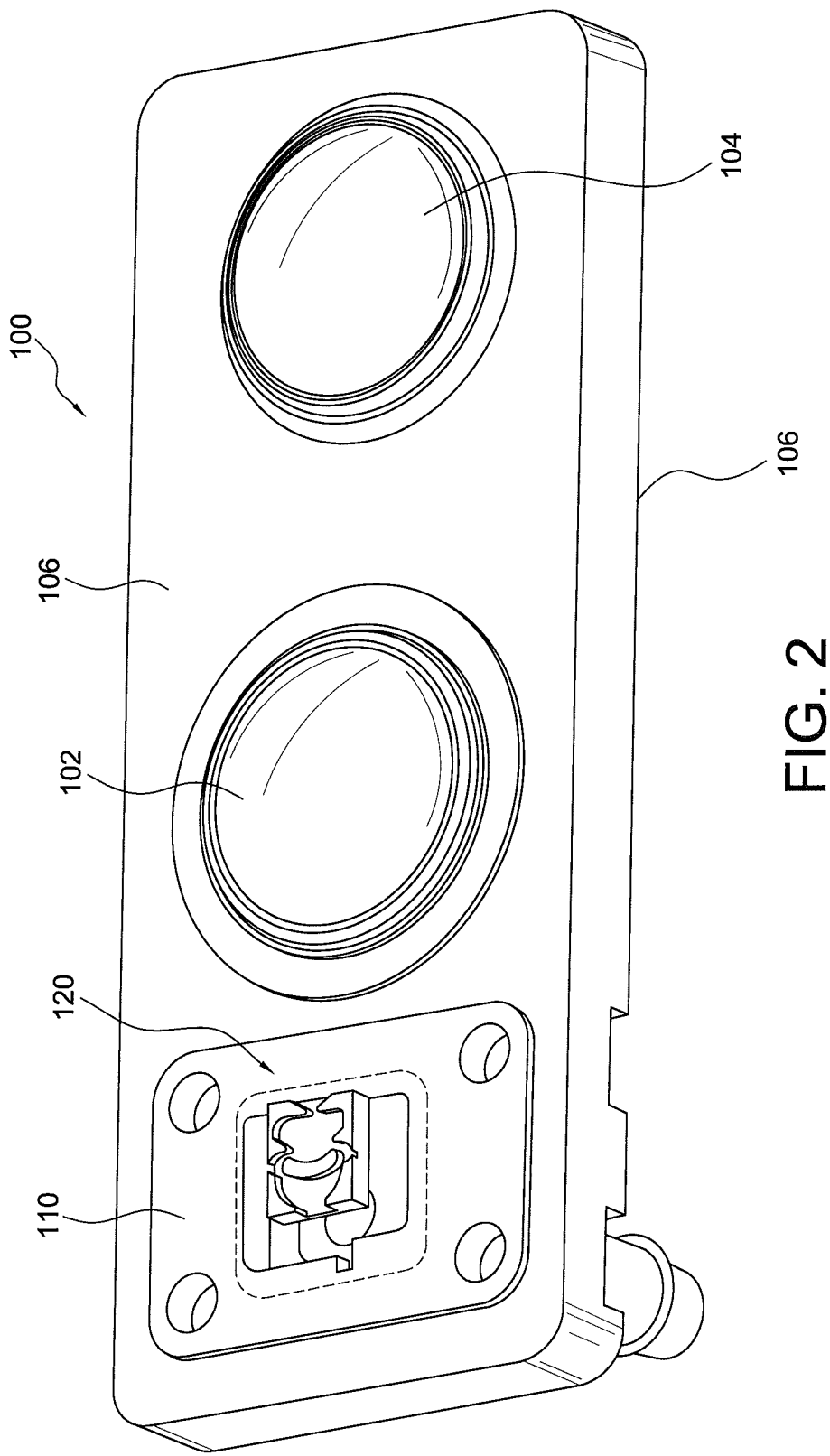
FIG. 2 is a perspective view, in elevation, of an integrated multi image sensor and lens washing nozzle assembly seen from the top or distal side of the housing cover or bezel, showing a partial cross section which reveals the internals of the nozzle assembly's spray head and showing that the fluidic circuit's features are symmetrically defined about an axis of symmetry or fluidic axis centered on the fluidic's outlet or spray orifice and that the fluidic's axis is aimed by the nozzle head to be substantially coaxial with the spray axis, in accordance with the present invention.
Figure 4:
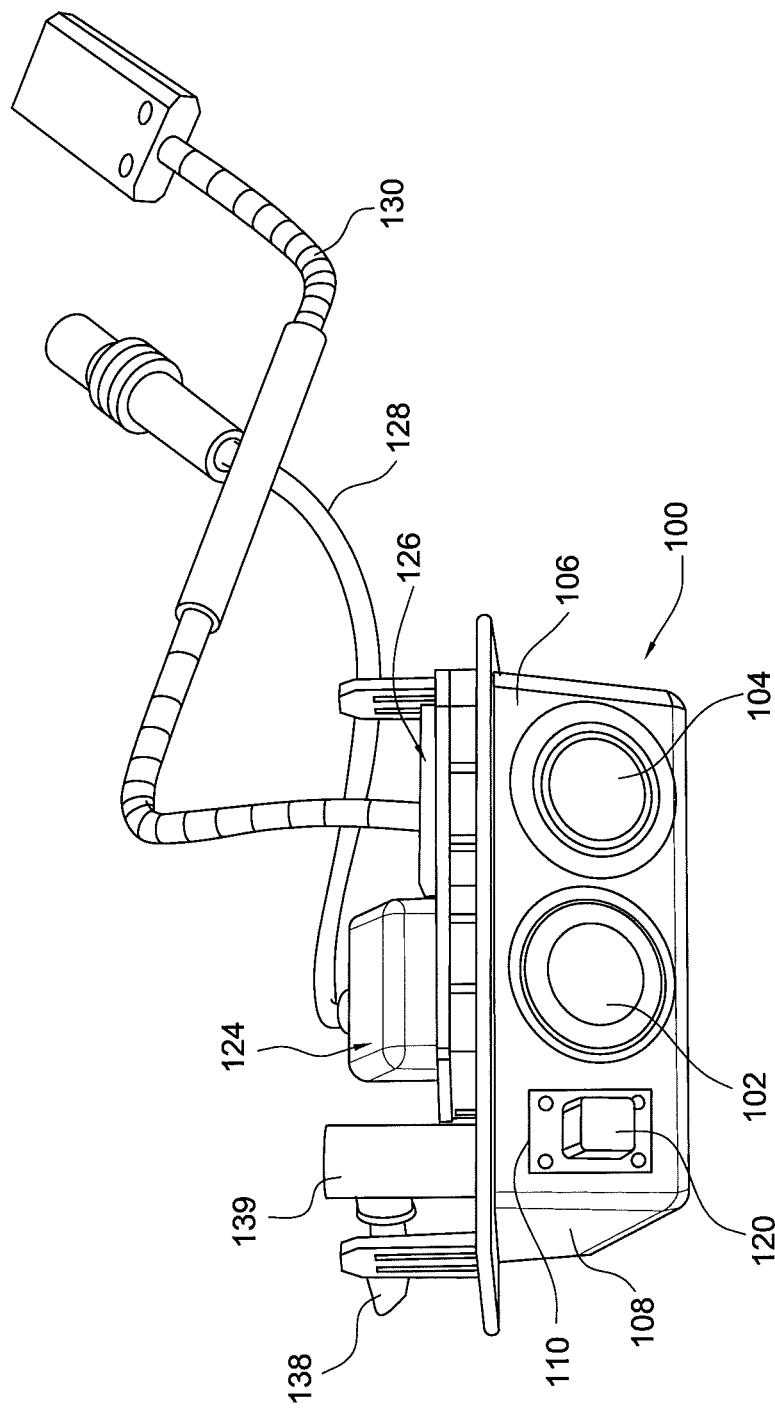
FIG. 4 is a perspective view of the assembly of FIGS. 2 and 3 mounted on a sprayer system housing, in accordance with the present invention.
Figure 6:
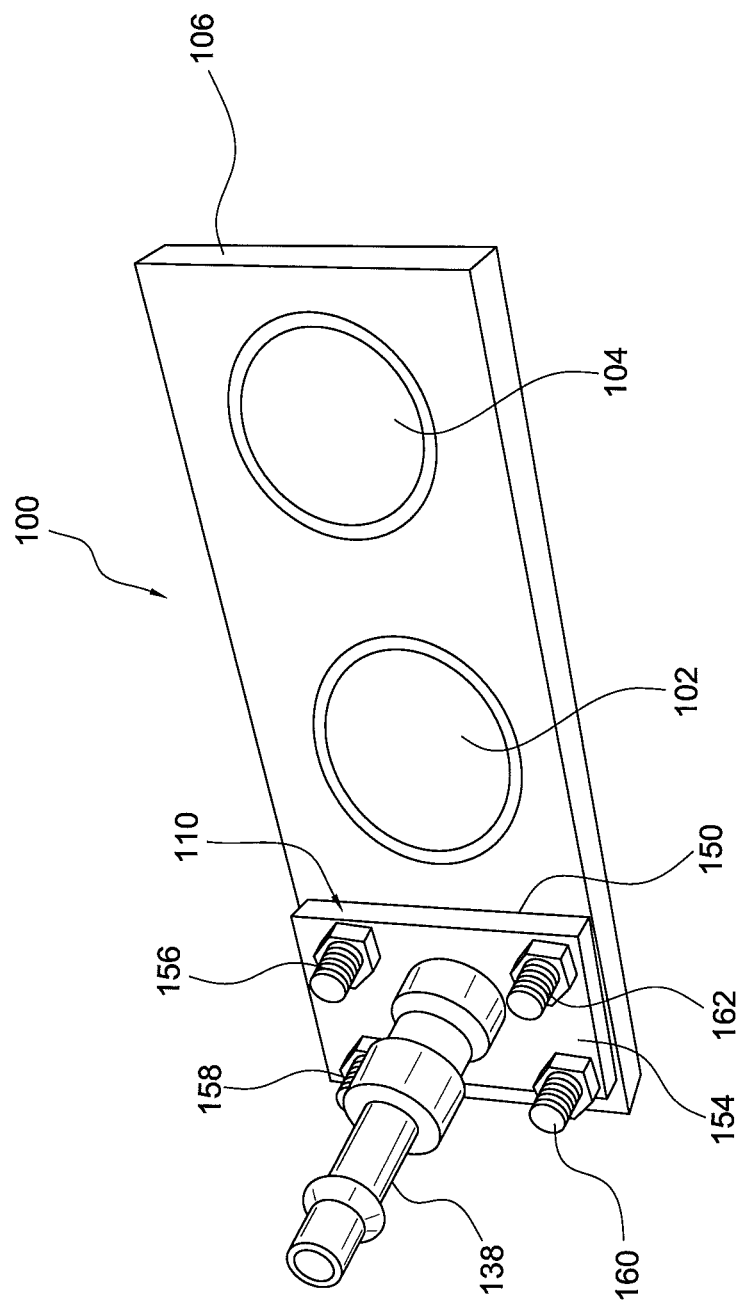
FIG. 6 is a rear perspective view of the integrated multi image sensor and lens washing nozzle assembly of FIGS. 2 and 3, in accordance with the present invention.

As generally illustrated in FIGS. 2, 4 and 6, the spray nozzle assembly 120 is secured to the housing cover 106 by an adjustable mounting fixture 150 which incorporates, for example, a pair of plates 152 and 154 on the upper and lower surfaces of cover 106, clamped together by four threaded fasteners, pins or bolts 156, 158, 160 and 162, passing through the housing wall and secured by corresponding nuts or clips. The spacing between the clamped plates may be adjusted at any corner, as by suitable shims, to adjust the height and the vertical angle of the spray head. The spray head may be rotated in the housing as well, to permit a wide range of adjustment of the spray nozzle, and thus of the vertical and horizontal direction of the spray 122.

The nozzle assembly's spray head 120 is mounted on the upper plate 152 and is connected through the plates 152 and 154 to the fluid supply tube 138. The spray nozzle optionally includes a stepped mushroom fluidic oscillator as described in commonly owned U.S. Pat. No. 7,267,290, the entirety of which is incorporated herein by reference, and illustrated in FIGS. 8A and 8B. This fluidic oscillator is preferably configured as an insert or chip 170 having open channels or lumens defined in at least one surface of the insert. Exemplary fluidic chip 170 has an interaction chamber 172 for providing an exhaust flow at an outlet aperture or orifice 174 in the form of an oscillating spray of fluid droplets (e.g., 122). The oscillator's geometry includes a pair of power nozzles 176 configured to accelerate the movement of pressurized inlet fluid from inlet tube 138 which is in fluid communication with the insert's inlet lumen 178. The interaction, or oscillating chamber 172 receives the flow from the power nozzles and generates and maintains moving vortices to produce an oscillating spray of fluid droplets which are sprayed through outlet orifice 174, along a fluidic axis 177 which, in use, is coaxial with spray axis 112.

A flow instability generating feature preferably comprises a protrusion that extends inward from each sidewall 180, 182 of the fluid pathway so as to cause a flow separation region downstream of the protrusions, but may comprise a step 184 in the height elevation of the floor of the power nozzles 176 with respect to that of the interaction chamber, as best seen in FIG. 8B. Posts 186 provide a filter for the fluid. In the illustrated embodiment, fluidic 170 has an internal fluid channel geometry which is symmetrical about fluidic axis 177 and outlet orifice 174 is defined as an aperture which is bisected by or centered around fluidic axis 177 and oscillating spray 122 is preferably a fan shaped spray of droplets having a selected fan width which is centered on fluidic axis 177.

Fluidic oscillators can provide a wide range of liquid spray patterns by cyclically deflecting a fluid jet. The operation of fluidic oscillators, as preferably utilized in the present invention, is characterized by the cyclic deflection, or oscillation, of a fluid jet. An advantage of fluidic oscillators is that they provide an oscillating spray of fluid droplets but don't require moving parts and so are not subject to the wear and tear which adversely affects the reliability and operation of other oscillating spray devices. Alternatively, camera housing and nozzle assembly of the invention may have a featureless hollow interior lumen defining a cylindrical or annular fluid path from a fluid inlet 138 to an open shear nozzle adapted to spray external objective lens surfaces with washer fluid, preferably at a narrow, glancing angle nearly parallel to the lens cover external surfaces.

Preferably, the laterally offset spray nozzle assembly 120 in the integrated multiple lens washer 100 is mounted and configured to aim the spray 122 a first selected lateral offset distance D1 from the nozzle's outlet 174 to the center of the external surface of the nearest objective lens or lens cover 102 (see FIGS. 3 and 5) of about 15 mm. The selected lateral offset distance is preferably within the range bounded by 10 mm and 30 mm, in order to keep the entire package as compact as possible. Similarly, the lateral offset distance D2 between the center of lens cover 102 and the center of the most distant lens cover 104 (in the two-sensor embodiment here illustrated) may also be about 15 mm, and preferably within a range of 10 mm to 30 mm.

Figure 5:
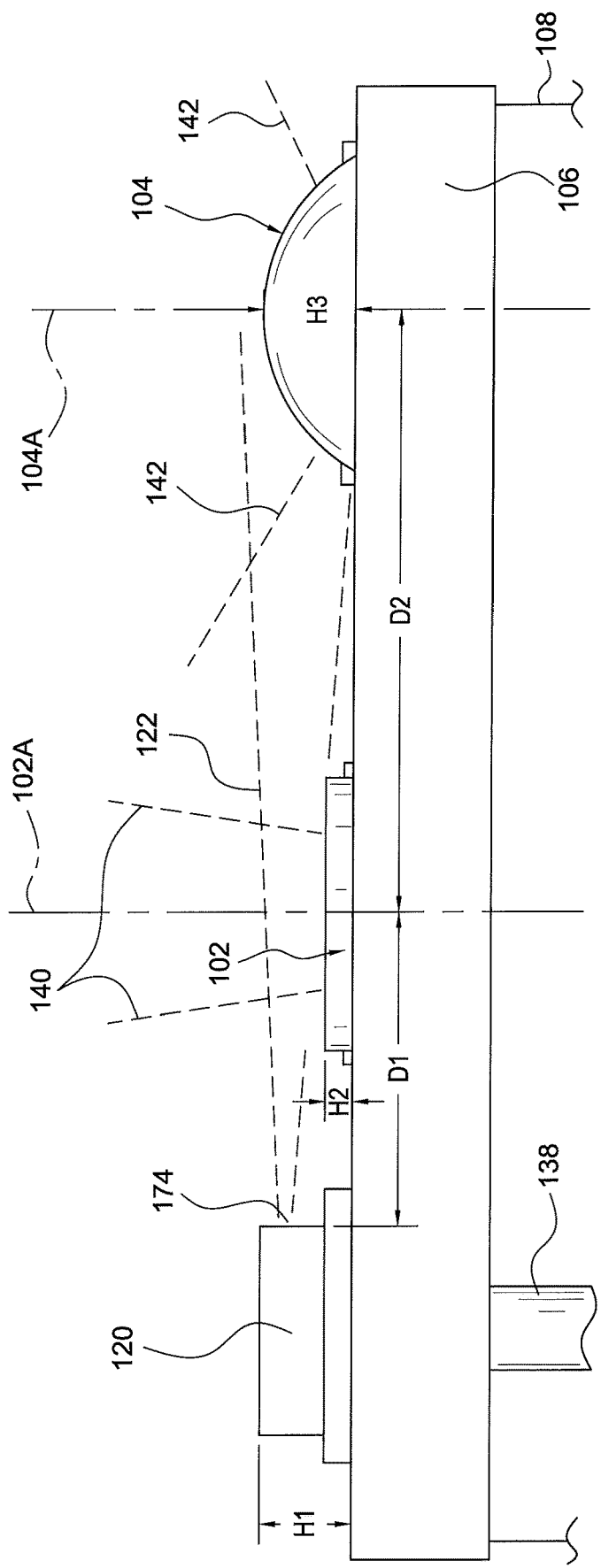
FIG. 5 is a diagram and side view illustrating alignment of the components for the integrated multi image sensor and lens washing nozzle assembly of FIGS. 2 and 3, in accordance with the present invention.

As illustrated in FIG. 5, the relative heights H1 of the nozzle 120, H2 of the lens cover 102, and H3 of the dome lens cover 104, are selected to aim the spray 122 in a direction substantially parallel to the top planar surface of the housing 106, across and nearly parallel to the top surface of lens or cover 102 to graze the top surface of lens 102 and to substantially directly impact the surface of lens 104. The associated bracket 150 holds the spray nozzle in a fixed location relative to the lenses both in lateral offset and azimuth from the center line or axis 112 of the lens and nozzle assembly and above the lens.

There are several variables to consider when designing this multi-lens sensor and washer nozzle cleaning system and package, including: mounting methods, packaging space, field of view (FOV) considerations and adverse system effect mitigation.

The preferred mounting or attachment method for the nozzle assembly 110 is integrating the nozzle assembly 110 upon or into the sensor bezel or housing, as illustrated. This mounting location assures that no matter where the sensors are located, fluid sprayed from the nozzle is always aimed at the right location toward the center of the lens surfaces. A nozzle mounted separately from the sensor housing could be subject to alignment and tolerance issues and become misaimed. It is of course understood that there will be some multiple sensor designs that do not allow for direct attachment and will require separate mounting schemes. The basics of good nozzle placement discussed above are the same regardless of attachment method.

In general, the location of multiple sensor assemblies in vehicles is limited to certain specific regions, due to packaging and line-of-sight objectives. Unfortunately for sensor washing nozzle packaging, prime vehicle panel exterior locations also tend to be good for other components like; liftgate handles or lighting components. As a result, these vehicle panel exterior locations have very tight packaging constraints, driving the need for very small nozzles and tight nozzle-to-sensor envelopes.

It should be understood that many existing sensors, such as the fish-eye lenses of some cameras, have field of view (FOV) angles from 120 to 170 degrees. A major constraint to system functionality is to have nothing intrude into the displayed field of view of the sensors so that the user is not distracted by the appearance of the lens washing nozzle 110. Thus, the nozzle should be laterally positioned in such a way that it is not in the sensor FOV. In the illustrated embodiments of the present invention, the nozzle is oriented and aimed from a fixed nearly parallel-to-lens location, to be away from and behind the FOV of the sensors. As the sensor FOV approaches and exceeds 180 degrees this will become impossible, of course; in fact, with very large angles other components of the vehicle will become visible to the sensors. It will then be necessary to place the assembly so that it is "hidden" in the clutter of the vehicle's exterior surface features, minimizing intrusion into "clear" view of the sensors.

In the preferred embodiment of the invention, the spray nozzle 110 of assembly 100 creates a fluid distribution in which the entirety, or as much as possible, of both lenses or lens covers are covered by fluid, with the fluid glancing across the nearest lens cover at about −1 degrees to −20 degrees or so before the nozzle head 120 becomes visible to the sensor, ("aim angle"). Although the height H2 of the nearest lens 102 is lower than the height H1 of the nozzle outlet 174 the FOV of this sensor must be relatively narrow, as illustrated at 140 in FIG. 6, while the distance between the nozzle outlet and the farthest lens 104 (D1+D2) allows sensor 104 to have a relatively wide FOV as indicated at 142. Another significant advantage to nearly parallel impact of the spray 122 to the lens 104 is that the fluid is fully engaged in pushing the debris off or laterally across the lens, and not in obliquely impacting or bouncing off the lens as would be experienced in higher aim angles, with a more direct impingement. On the other hand, the dome shape of lens 104 allows a more direct impact of the spray to clear the lens even at the greater distance. Further, as the aim angle increases, the nozzle must be moved further up from the surface of the housing, increasing its exposure to the FOV, and making cosmetically attractive packaging difficult. Therefore, the nozzle should be kept within 10 degrees (aim angle down to the lens) to keep cosmetic packaging reasonable.

In addition to aim angle considerations, the nozzle distance from the centers of the lenses (as illustrated in FIG. 6) is important. The closer the nozzle is to the center of the nearest lens 102, the wider the fluid distribution (and spray fan angle) must be to cover the entirety of the lens. Excessive closeness to the lens center is objectionable for a number of reasons. Firstly, the nozzle is simply too close to the camera body and may clash with it physically. Secondly, the distribution angle (or spray fan angle) needs to be wider to get good coverage. Wider spray fan angles spread a relatively small fluid flow over a larger lens cleaning area, which could result in the need for a different distribution geometry or higher flow rates. Applicants have found that with one effective distribution geometry, the lateral offset distance between the nozzle outlet and the nearest sensor lens cover is preferably between about 18 mm and about 28 mm. This lateral offset is approximate, as aim angle and nozzle distal height variations tend to complicate the geometry.

Persons of skill in the art will recognize that the integrated multi image sensor and lens washing nozzle assembly 100 is configured (preferably) with a housing 108 having an outwardly oriented wall or bezel surface 106 which defines a substantially planar housing fixture surface or bezel surface 106 which supports a nozzle assembly 110 which includes a distally projecting spray nozzle head 120. The spray nozzle head projects distally from the surface of bezel surface 106 by only a few millimeters and preferably encloses and aims a fluidic oscillator (e.g., 170) (as shown in FIG. 8A). Nozzle head 120 is shaped like a distally projecting box-shaped enclosure which is near or proximate the peripheral edge of first lens surface 102, which is spaced from a second lens 104 within bezel surface 106 and the fluidic oscillator generates a high velocity spray 122 with a selected fan angle (e.g., 35 degrees), to wash both (multiple) lenses 102, 104 and provide a compact and unobtrusive unitary multi-camera and camera washing nozzle assembly package 100. Nozzle head 120 may also be configured to generate fan-shaped shear jets.

Integrated multi image sensor and lens washing nozzle assembly 100 includes an inlet tube or barb 138 which defines a fluid transmission channel in fluid communication with nozzle head 120. Housing fixture 108 is configured to enclose and support the multiple (e.g., first and second) image sensors or cameras and to constrain each camera's external lens 102, 104 exposed toward the distal side. Each external lens has an external lens surface 102, 104 with a lens perimeter and a lens central axis 102A 104A projecting distally from each lenses surface, wherein each lens' field of view is defined as a distally projecting solid angle (e.g., 140, a truncated cone or pyramid, encompassing the view in a video display to be viewed by the driver (not shown)) including the lens central axis 102A, 104A and originating within the lens perimeter. Washing system 110 includes at least a first nozzle assembly configured to be supported and aimed toward the external lenses 102, 104 by the low-profile housing fixture 120 which defines an enclosed internal fluid transmission duct or lumen which provides unimpeded continuous fluid communication between fluid inlet 138 and the nozzle head 120 which optionally includes a cavity configured to cooperate with a fluidic circuit insert (e.g., 170). More specifically, nozzle head 120 is configured as an upwardly or distally projecting box-shape enclosure which distally projects from the aiming fixture's distal wall segment 106. Housing fixture 108 and bezel wall segment 106 are preferably made as separable plastic components and optionally are sealably engaged together when assembled by inclusion of annular elastomeric or rubber seal between the proximal side surface of bezel 106 and the camera housing enclosure 108.

The nozzle assembly 110 is configured and aimed to spray washing fluid in a substantially planar sheet 122 having a selected thickness toward the external lens surfaces 102, 104 and across the field of view, spraying at a first selected spray aiming angle (e.g., spraying in a plane inclined proximally at an angle) of about 1°. The selected aiming angle can be in a range between 1° and 20° (as seen in FIG. 5) relative to a plane tangent to the lens external surfaces 102, 104. Nozzle head 120 is oriented to spray from a selected side, meaning that it is aimed to spray along a first selected spray azimuth angle in relation to a selected fixed reference point or datum 102D, 104D on each lenses perimeter. Distally projecting nozzle head 120 is positioned beside and aimed to spray along transverse spray axis 112 which intersects (and so is aimed at) the center of each distal objective lens surface 102, 104, so the spray axis 112 from the nozzle head 120 is preferably aimed to intersect the each lens axis 102A, 104A and that spray 122 passes over each lenses peripheral edge at each lenses reference point or datum 102D, 104D.

Preferably, lens washing nozzle fluidic circuit (e.g., 170) includes a first fluidic oscillator's first interaction chamber 172 configured to operate on a selectively actuated flow of pressurized washing fluid flowing through the inlet to generate a first exhaust flow of fluid droplets 122, and the housing's fluid inlet 138 receives pressurized washer fluid and is in fluid communication with the fluidic's interaction chamber 172 which passes the pressurized washer fluid distally to the first laterally offset outlet nozzle 174 which is aimed toward the external lens surfaces and across the lenses fields of view. The preferred spray flow rate is approximately 200 ml/min per nozzle at 18 psi, and the spray thickness (i.e., which is seen as thickness in the spray plane transverse to the spray's fan angle plane, as shown in FIG. 5) is preferably greater than 2 degrees, if washing both lenses. Thicker sprays may be selected for different nozzle head and lens placement configurations. The oscillating action and large drops generated by the fluidic oscillator aimed by nozzle head 120 in this manner were discovered to simultaneously wet multiple lens surfaces very rapidly and provided a kinetic impact effect which was found to dislodge, dissolve and drive debris (not shown) as part of a flowing effluent laterally off bezel surface 106.

Optionally, nozzle head 120 may be configured as a non-oscillating shear nozzle configured to generate a substantially flat fan spray having a selected spray fan angle (e.g., 35°) the non-oscillating fan spray is less effective than the oscillating spray of droplets having a relatively uniform size and velocity. Alternatively, laterally offset low-profile washing nozzle head 1030 may be configured as a non-oscillating bug-eye nozzle configured to generate at least one substantially solid fluid jet (i.e., a substantially solid fluid stream having no fan angle), which is also less effective than the oscillating spray 122 illustrated in FIGS. 7A and 7B.

The integrated multi image sensor and lens washing nozzle assembly 100 illustrated in FIGS. 2-7B is preferably is configured as an integrated automotive multi-camera module and nozzle assembly, with the multi-camera module and the aimed nozzle assembly 110 integrally packaged as a one-piece unitary module 100 configured for assembly into a vehicle 8. Each fluid impermeable camera module within housing 108 is enclosed behind and affixed within low-profile housing fixture bezel 106 and has an interior configured to enclose and aim an imaging sensor having an objective lens and a pixelated image sensor array (e.g., like 18), where bezel 106 may be transparent and define part of each camera's objective lens assembly.

The nozzle head 120 may be in a two-piece configuration. The housing's nozzle head 120 can include a cavity or socket (not shown) which constitutes one of the two main nozzle pieces. The fluidic insert or chip (e.g., 170) constitutes the other. If the nozzle head includes a cavity to receive insert 170, then a generally flat, planar floor surface defined in that cavity terminates in a wide, generally rectangular opening defined in the lens-facing side surface of the housing's distally projecting enclosure. Internally, the fluid transporting lumen from inlet 138 is in fluid communication with the interior of nozzle head 120 and with a fluidic inlet supply channels or lumen which terminates in an openings in a cavity sidewall surface (not shown). The fluid supply lumens communicate with the interior volume defined within the nozzle head's cavity, and when pressurized fluid is pumped into and through the nozzle supply channel, that fluid flows into the cavity and into and through the fluidic (e.g., 170).

The fluidic insert or chip (e.g., 170) is a generally flat member adapted to be forced or pressed into the housing's cavity 1011C and securely retained therein by the pressure exerted by the housing cavity walls on the insert. For this purpose the material from which the housing is fabricated is a solid plastic which deforms slightly under pressure. The cavity has a top wall and bottom wall which are spaced by a distance substantially equal to the thickness of the insert (e.g., 170) between the insert top surface and bottom surface. Optionally, the bottom surface may somewhat bowed, making the insert somewhat thicker along its middle. The insert's sidewalls are likewise spaced by a distance substantially equal to the width of insert between its left and right side or lateral edges. In a preferred embodiment, fluidic circuit insert (e.g., 170) may be a few thousandths of an inch wider than the nozzle head's cavity. The insert and cavity may taper along their lengths, being wider at the forward end and narrowing toward the rearward end. The taper may be gradual or may be effected in plural discrete sections which are slightly angled toward one another.

The fluidic oscillator defined in the insert (e.g., 170) as a plurality of recessed portions in the top surface. Specifically, the oscillator includes left and right opposing power nozzle venturi-shaped channels 176 directed inwardly toward the center of interaction region 172. The forward end of the interaction region terminates in an exit throat or orifice 174 which is aligned with the central axis of the fluidic 177 and the spray pattern 122 is preferably symmetrical about that axis 177. All of the fluidic's features are defined as recesses of equal or varying depths into the top surface of the insert or chip. When the fluidic insert (e.g., 170) is fully inserted into the housing's slot or cavity, the housing's internal lumen defines an opening into the cavity, and that opening aligns with and communicates with the insert's inlet 178, so that washer fluid or water flowing into the housing inlet 138 flows into interaction chamber 172 to generate oscillating vortices therein, so that an oscillation is established and a jet of fluid is swept back and forth to generate the desired spray 122 which issues through the exit orifice 174. When the selected fluidic insert (e.g., 170) is pressed or forced into the nozzle head's cavity, the cavity's sidewalls are spread slightly and in turn exert a higher pressure along the middle of the insert. The oscillator formed in top surface of the insert (e.g., 170) is substantially centered between edges of the insert and is very tightly sealed against interior walls of the cavity so that a fluidic oscillator formed in a surface of the insert, or in a surface of the cavity, can be sealed solely by the pressure exerted by the forced fit engagement.

It should be noted that the nozzle head's cavity and fluidic insert (e.g., 170), although shown as substantially planar, may be arcuate, angled, or otherwise configured, depending upon the shape of nozzle head 120 and spray pattern desired. Likewise, oscillator channels may be defined in both the top and bottom surfaces of the insert or in the top and bottom walls of the cavity. The only limitation is that the fluidic oscillator, whichever surface or surfaces it is defined in, is sealed by the abutting surface(s) through the pressure exerted by the force fit within the housing's cavity.

When integrated multi image sensor and lens washing nozzle assembly 100 is in use, pressurized washer fluid flows into the fluid inlet 138 and then into the interaction chamber which passes the pressurized washer fluid distally to the outlet orifice 174 which is configured aid aimed to spray or exhaust the washer fluid from the interaction chamber and generate an oscillating spray of high velocity fluid droplets 122 aimed toward external objective lens surfaces 102, 104 and across each image sensor's field of view. An external trim piece (not shown) may be fashioned with an inconspicuous bulge or blister which will entirely covers and substantially conceals the distally projecting nozzle head 120 and the nozzle orifice from which spray 122 emerges, while permitting the lateral spray to project from the nozzle in an entirely unimpeded flow, where any accumulated debris or soil will be washed off of lens surfaces 102, 104 and over the external outwardly facing downstream surface of external bezel member 106.

Figure 9:
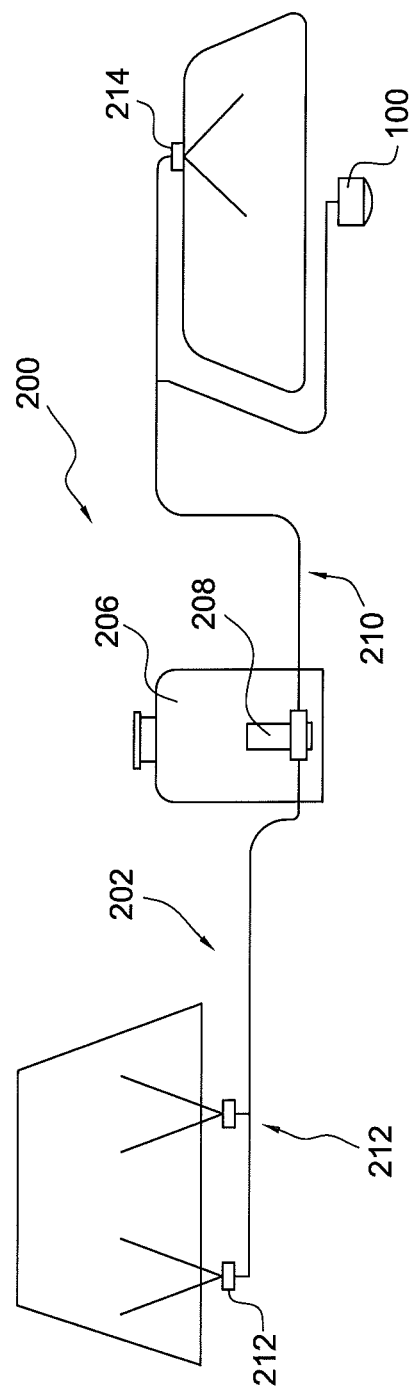
FIG. 9 is a diagram of automotive external camera lens washer system with components suitable for connection with the integrated multi image sensor and lens washing nozzle assembly of FIGS. 2-6, in accordance with the present invention.

The lens washing system of the present invention is readily integrated into an OEM's standard equipment such as that illustrated at 200 in FIG. 9, that is already specified for inclusion in many automobiles and other vehicles. As illustrated in FIG. 9, for example, an existing windshield washing system 202 (a "front wash") or rear window washing system 204 ("rear wash") require use of a washing fluid reservoir and pumping system to provide a supply of pressurized washing fluid. A washer tank or reservoir 206 typically includes an internal pump 208 which is activated to draw washing fluid from the reservoir to supply pressurized fluid to a conduit network 210 (e.g., comprising lumens, tubes or hoses) which supply the windshield washing nozzles 212 and rear window washing nozzle(s) 214. In the system of the present invention lens washing may be actuated in response to driver control input or automatically. In automatic operation, lens washing is initiated or triggered in response to the driver's use of the windshield washing system or "front wash" (e.g., where lens washing happens every time the windshield is sprayed with front wash nozzle 212 or alternatively, lens wash may be selectively actuated periodically, with one momentary lens wash cycle for every 3-5 front wash events). Similarly, rear window or liftgate/backlight cleaning can be linked to lens washing for a back-up camera system 100, as described hereinabove, wherein backup camera lens washing happens every time the rear window is sprayed with rear wash nozzle 214 or alternatively, a backup camera lens wash may be selectively actuated periodically, with one momentary lens wash cycle for every 3-5 rear wash events.

Alternatively, camera lens washing may be user-controlled using an interior display, wherein a remotely controllable system 100 includes at least one nozzle assembly 110 configured to clean a pair of image sensor objective lens surfaces or lens covers to wash away accumulated image distorting debris. The display mounted within the vehicle's interior may be connected via the vehicle's data communication network to the sensor's external objective lens surface. Since the image sensor is exposed to the ambient environment, image distorting debris will accumulated when the vehicle is in use. The image sensor lens washing system is configured with a laterally offset washing nozzle to selectively spray washing fluid onto the image sensor's objective lens surfaces at a narrow, glancing angle for the nearer lens and at a directly impacting angle for the more distant lens. The spray is aimed across the field of view along an aiming angle within the range bounded by 1° and 20°, for example, in relation to the external objective lens surface, with the spray being actuated in response to a momentary wash control signal of a few seconds duration. A washing system actuation switch mounted within the interior of the vehicle and is configured to selectively and momentarily generate the wash control signal when actuation of the lens washing system is desired by the driver, while viewing the display.

The addition of a multi-lens integrated cleaning system 100 in accordance with the present invention to standard vehicle systems can be accomplished in a number of ways. They can be tied into existing systems, like the rear glass cleaning system in an SUV, whereby the sensor lenses are cleaned whenever the rear glass is cleaned and vice-versa. Systems can also be designed such that cleaning is on-demand, requiring the addition of a dedicated pump and controller or control system programmed to perform the method steps described above. However, it is highly preferable to keep the same numbers and sizes of existing washer fluid reservoirs, for it is highly unlikely that a second reservoir or fluid bottle would be added to a vehicle to accommodate a sensor cleaning nozzle system. Since vehicle packaging generally does not allow for larger washer reservoirs, any multi-lens cleaning system must consume as little fluid as possible to have the least impact on the overall vehicle performance.

As noted above, minimizing the overall effect of the addition of the lens washer system of the invention to existing vehicle systems is desired, so a small flow rate is preferred for the nozzle system 100. One embodiment may use a fluidic nozzle with a target flow rate of 200+/−40 mL/min @ 18 PSI, which has been shown to be very effective in cleaning the lenses with the aforementioned packaging guidelines. With these flow and packaging considerations in mind, the stepped mushroom fluidic circuit of FIGS. 8A and 8B is capable of performing well in cold weather conditions with 0.06 mm step and allows for very small packaging at 5 mm×5 mm for a 200 mL/min flow rate and 35° spray fan angle for spray 122. Most importantly, this design can maintain a minimum 0.014" power nozzle dimension which is required for good clog resistant performance. Power nozzles smaller than this risk clogging in automotive situations. The fluidic circuit has also been provided with internal filters (see, e.g., filter posts 186).

Integrated multi image sensor and lens washing nozzle assembly 100 is configured (preferably) with a housing 108 having an outwardly oriented wall or bezel surface 106 which defines a substantially planar housing fixture surface or bezel surface 106 which supports a nozzle assembly 110 which includes a distally projecting spray nozzle head 120. The spray nozzle head projects distally from the surface of bezel surface 106 by only a few millimeters and preferably encloses and aims a fluidic oscillator (e.g., 170) (as shown in FIG. 8A). Nozzle head 120 is shaped like a distally projecting box-shaped enclosure which is near or proximate the peripheral edge of first lens surface 102, which is spaced from a second lens 104 within bezel surface 106 and the fluidic oscillator generates a high velocity spray 122 with a selected fan angle (e.g., 35 degrees), to wash both (multiple) lenses 102, 104 and provide a compact and unobtrusive unitary multi-camera and camera washing nozzle assembly package 100. Nozzle head 120 may also be configured to generate fan-shaped shear jets.

Integrated multi image sensor and lens washing nozzle assembly 100 includes an inlet tube or barb 138 which defines a fluid transmission channel in fluid communication with nozzle head 120. Housing fixture 108 is configured to enclose and support the multiple (e.g., first and second) image sensors or cameras and to constrain each camera's external lens 102, 104 exposed toward the distal side. Each external lens has an external lens surface 102, 104 with a lens perimeter and a lens central axis 102A 104A projecting distally from each lenses surface, wherein each lens' field of view is defined as a distally projecting solid angle (e.g., 140, a truncated cone or pyramid, encompassing the view in a video display to be viewed by the driver (not shown)) including the lens central axis 102A, 104A and originating within the lens perimeter. Washing system 110 includes at least a first nozzle assembly configured to be supported and aimed toward the external lenses 102, 104 by the low-profile housing fixture 120 which defines an enclosed internal fluid transmission duct or lumen which provides unimpeded continuous fluid communication between fluid inlet 138 and the nozzle head 120 which optionally includes a cavity configured to cooperate with a fluidic circuit insert (e.g., 170). More specifically, nozzle head 120 is configured as an upwardly or distally projecting box-shape enclosure which distally projects from the aiming fixture's distal wall segment 106. Housing fixture 108 and bezel wall segment 106 are preferably made as separable plastic components and optionally are sealably engaged together when assembled by inclusion of annular elastomeric or rubber seal between the proximal side surface of bezel 106 and the camera housing enclosure 108.

The nozzle assembly 110 is configured and aimed to spray washing fluid in a substantially planar sheet 122 having a selected thickness toward the external lens surfaces 102, 104 and across the field of view, spraying at a first selected spray aiming angle (e.g., spraying in a plane inclined proximally at an angle) of about 1°. The selected aiming angle can be in a range between 1° and 20° (as seen in FIG. 5) relative to a plane tangent to the lens external surfaces 102, 104. Nozzle head 120 is oriented to spray from a selected side, meaning that it is aimed to spray along a first selected spray azimuth angle in relation to a selected fixed reference point or datum 102D, 104D on each lenses perimeter. Distally projecting nozzle head 120 is positioned beside and aimed to spray along transverse spray axis 112 which intersects (and so is aimed at) the center of each distal objective lens surface 102, 104 so the spray axis 112 from the nozzle head 120 is preferably aimed to intersect the each lens axis 102A, 104A and that spray 122 passes over each lenses peripheral edge at each lenses reference point or datum 102D, 104D.

Preferably, lens washing nozzle fluidic circuit (e.g., 170) includes a first fluidic oscillator's first interaction chamber 172 configured to operate on a selectively actuated flow of pressurized washing fluid flowing through the inlet to generate a first exhaust flow of fluid droplets 122, and the housing's fluid inlet 138 receives pressurized washer fluid and is in fluid communication with the fluidic's interaction chamber 172 which passes the pressurized washer fluid distally to the first laterally offset outlet nozzle 174 which is aimed toward the external lens surfaces and across the lenses fields of view. The preferred spray flow rate is approximately 200 ml/min per nozzle at 18 psi, and the spray thickness (i.e., which is seen as thickness in the spray plane transverse to the spray's fan angle plane, as shown in FIG. 5) is preferably greater than 2 degrees, if washing both lenses. Thicker sprays may be selected for different nozzle head and lens placement configurations. The oscillating action and large drops generated by the fluidic oscillator aimed by nozzle head 120 in this manner were discovered to simultaneously wet multiple lens surfaces very rapidly and provided a kinetic impact effect which was found to dislodge, dissolve and drive debris (not shown) as part of a flowing effluent laterally off bezel surface 106.

Optionally, nozzle head 120 may be configured as a non-oscillating shear nozzle configured to generate a substantially flat fan spray having a selected spray fan angle (e.g., 35°) the non-oscillating fan spray is less effective than the oscillating spray of droplets having a relatively uniform size and velocity. Alternatively, laterally offset washing nozzle head 120 may be configured as a non-oscillating bug-eye nozzle configured to generate at least one substantially solid fluid jet (i.e., a substantially solid fluid stream having no fan angle), which is also less effective than the oscillating spray 122 illustrated in FIGS. 7A and 7B.

The integrated multi image sensor and lens washing nozzle assembly 100 illustrated in FIGS. 2-7B is preferably is configured as an integrated automotive multi-camera module and nozzle assembly, with the multi-camera module and the aimed nozzle assembly 110 integrally packaged as a one-piece unitary module 100 configured for assembly into a vehicle 8. Each fluid impermeable camera module within housing 108 is enclosed behind and affixed within low-profile housing fixture bezel 106 and has an interior configured to enclose and aim an imaging sensor having an objective lens and a pixelated image sensor array (e.g., like 18), where bezel 106 may be transparent and define part of each camera's objective lens assembly.

The nozzle head 120 may be a two-piece configuration. The housing's nozzle head 120 can include a cavity or socket (see, e.g., 310C-R in FIG. 10B) which constitutes one of the two main nozzle pieces. The fluidic insert or chip (e.g., 170) constitutes the other main piece. If the nozzle head includes a cavity to receive an insert 170, then a generally flat, planar floor surface defined in that cavity terminates in a wide, generally rectangular opening defined in the lens-facing side surface of the housing's distally projecting enclosure. Internally, the fluid transporting lumen from inlet 138 is in fluid communication with the interior of nozzle head 320 and with a fluidic inlet supply channels or lumen which terminates in an opening in each cavity's sidewall surface (not shown). The fluid supply lumens communicate with the interior volume defined within each nozzle head cavity, and when pressurized fluid is pumped into and through the nozzle supply channel, that fluid flows into the cavity and into and through the fluidic (e.g., 170).

The fluidic insert or chip (e.g., 170) is a generally flat member adapted to be forced or pressed into the housing's cavity and securely retained therein by the pressure exerted by the housing cavity walls on the insert. For this purpose the material from which the nozzle head 120 is fabricated is a solid plastic which deforms slightly under pressure. The cavity has a top wall and bottom wall which are spaced by a distance substantially equal to the thickness of the insert (e.g., 170) between the insert top surface and bottom surface. Optionally, the bottom surface may somewhat bowed, making the insert somewhat thicker along its middle. The insert's sidewalls are likewise spaced by a distance substantially equal to the width of insert between its left and right side or lateral edges. In a preferred embodiment, fluidic circuit insert (e.g., 170) may be a few thousandths of an inch wider than the nozzle head's cavity. The insert and cavity may taper along their lengths, being wider at the forward end and narrowing toward the rearward end. The taper may be gradual or may be effected in plural discrete sections which are slightly angled toward one another.

Figure 10A:
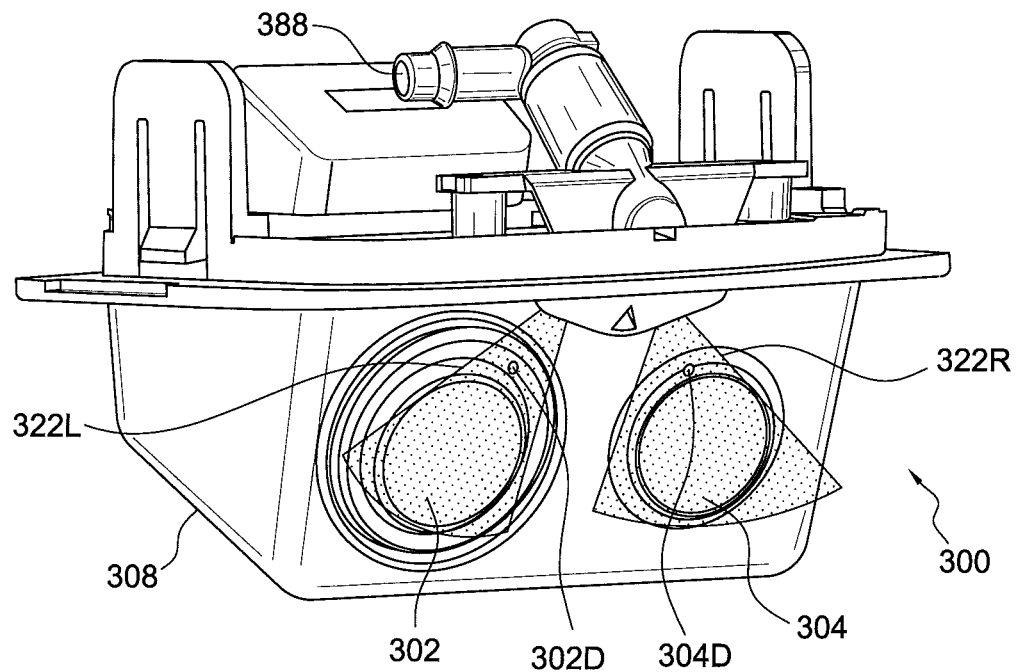
FIG. 10A is a perspective view, in elevation, of a second embodiment of the integrated multi image sensor and lens washing nozzle assembly seen from the external or distal side of the housing cover or bezel, showing a dual spray nozzle assembly's spray head and showing that the first spray is symmetrically defined about a first axis of symmetry or fluidic axis centered on the first fluidic's outlet or spray orifice and that the first fluidic's axis is aimed by the nozzle head to be substantially coaxial with the first spray axis which is centered on the first or left lens, and the second spray is symmetrically defined about a second axis of symmetry or fluidic axis centered on the second fluidic's outlet or spray orifice and that the second fluidic's axis is aimed by the nozzle head to be substantially coaxial with the second spray axis which is centered on the second or right lens, in accordance with the present invention.
Figure 10B:
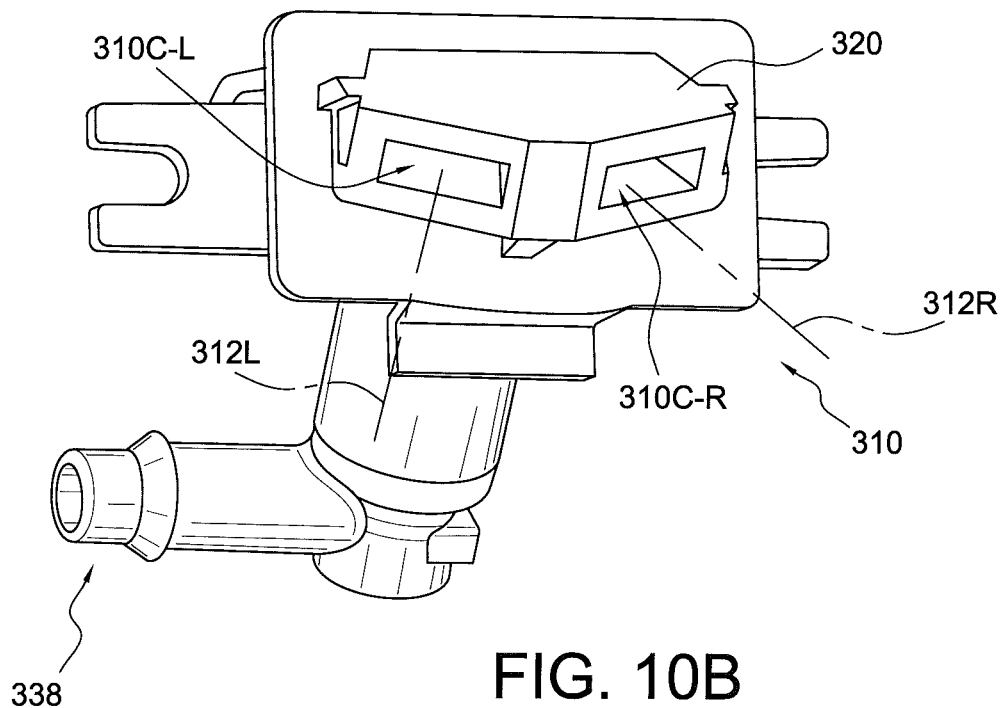
FIG. 10B is a perspective view of the dual spray nozzle head of FIG. 10A separated from its sprayer system housing, and illustrating first and second cavities configured to receive first and second fluidic inserts, in accordance with the present invention.

Turning now to the embodiment of FIGS. 10A-10D, FIG. 10A is a perspective view, in elevation, of another integrated multi image sensor and lens washing nozzle assembly 300 seen from the top or distal side of the housing cover or bezel 306, showing a dual spray nozzle assembly's spray head 320 and showing that the first spray 322L is symmetrically defined about a first axis of symmetry or fluidic axis 312L centered on the first fluidic's outlet or spray orifice and that the first fluidic's axis 312L is aimed by the nozzle head to be substantially coaxial with the first spray axis which is centered on the first or left lens 302. The second spray 322R is symmetrically defined about a second axis of symmetry or fluidic axis 312R centered on the second fluidic's outlet or spray orifice and that the second fluidic's axis 312R is aimed by the nozzle head 320 to be substantially coaxial with the second spray axis which is centered on the second or right lens 304, in accordance with the present invention. FIG. 10B is a perspective view of the dual spray nozzle head 310 of FIG. 10A separated from its sprayer system housing 308, and illustrating first and second (or left and right) cavities 310C-L and 310C-R configured to receive first and second fluidic inserts (e.g., 170).

Figure 10C:
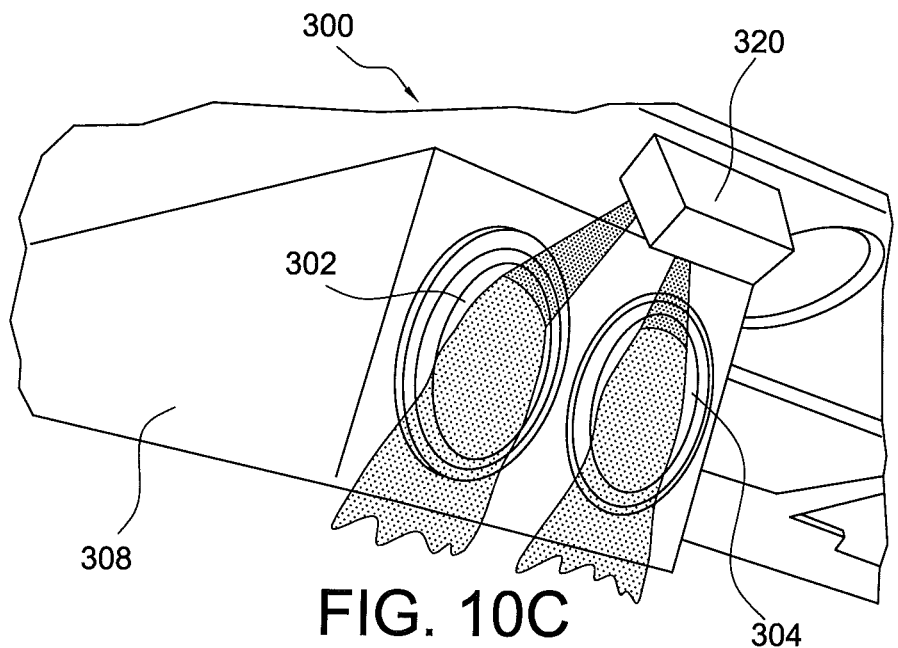
FIG. 10C is a photograph of the integrated multi image sensor and lens washing nozzle assembly of FIGS. 10A-10B, illustrating the nozzle assembly's spray head in operation and spraying from the first and second spray orifices and along the first and second spray axes and onto respective first and second lenses, in accordance with the present invention.
Figure 10D:
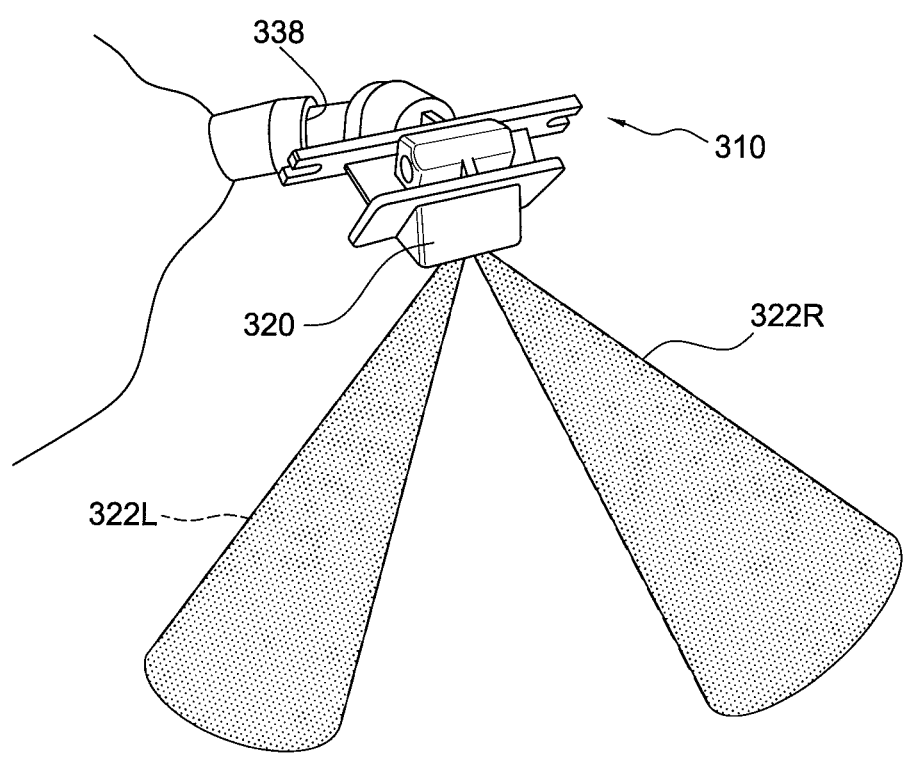
FIG. 10D is a faster speed exposure photograph of the lens washing nozzle assembly of FIGS. 10A-10C, showing the individual droplets of sprayed washing fluid in the side by side spray fans, in accordance with the present invention.

FIG. 10C is a photograph of the integrated multi image sensor and lens washing nozzle assembly 300, illustrating the nozzle assembly's spray head 230 in operation and spraying from the first and second spray orifices and along the first and second spray axes 312L, 312R and onto respective first and second lenses 302, 304. FIG. 10D is a faster speed exposure photograph of the lens washing nozzle assembly of FIGS. 10A-10C, showing the individual droplets of sprayed washing fluid in the side by side spray fans 322L, 322R.

The dual spray integrated multi image sensor and lens washing nozzle assembly 300 is configured (preferably) with a housing molded plastic 308 having an outwardly oriented wall or flange surface 306F which defines a substantially planar housing fixture surface or flange wall segment configured to support nozzle assembly 310 which includes a distally projecting spray nozzle head 320. The spray nozzle head 320 projects distally from the surface of flange 306F by only a few millimeters and preferably encloses and aims first and second fluidic oscillators (e.g., 170) (as shown in FIG. 8A). Nozzle head 320 is shaped like a distally projecting double-wedge shaped enclosure which is near or proximate the peripheral edge of first lens surface 302 and second lens surface 304. Module housing 308 has first lens 302 spaced from second lens 304 in a co-planar relationship within the housing's lens supporting bezel surface 306 which is oriented to be in a plane that is substantially perpendicular to spray head flange 306F.

Dual spray nozzle head 320 orients and aims the first and second fluidic oscillators to generates left and right high velocity sprays 322L and 322R, each with a selected fan angle (e.g., 35 degrees), to wash both (multiple) lenses 302, 304 and provide a compact and unobtrusive unitary multi-camera and camera washing nozzle assembly package 300. Nozzle head 320 may also be configured to generate fan-shaped shear jets.

Integrated multi image sensor and lens washing nozzle assembly 300 includes an inlet tube or barb 338 which defines a fluid transmission channel in fluid communication with nozzle head 320. Housing fixture 308 is configured to enclose and support the multiple (e.g., first and second) image sensors or cameras and to constrain each camera's external lens 302, 304 exposed toward the distal side. Each external lens has an external lens surface 302, 304 with a lens perimeter and a lens central axis 302A 304A projecting distally from each lenses surface, wherein each lens' field of view is defined as a distally projecting solid angle (e.g., a truncated cone or pyramid, encompassing the view in a video display to be viewed by the driver (not shown)) including the lens central axis 302A, 304A and originating within the lens perimeter.

The washing system of the present invention includes at least a first nozzle 310 assembly with dual nozzle outlet orifices configured to be supported and aimed toward the external lenses 302, 304 by the low-profile housing fixture 320 which defines an enclosed internal fluid transmission duct or lumen which provides unimpeded continuous fluid communication between fluid inlet 338 and the nozzle head 320 which includes left or first cavity 310C-L configured to cooperate with a first fluidic circuit insert (e.g., 170) and right or second cavity 310C-R configured to cooperate with a second fluidic circuit insert (e.g., 170), as illustrated in FIG. 10B. More specifically, nozzle head 320 is configured as an double-wedge shaped enclosure which projects from the aiming fixture's flange wall segment 306F. Housing fixture 308 and bezel wall segment 306 are preferably molded as a unitary plastic component.

The nozzle assembly 310 is configured and aimed to spray washing fluid in first and second substantially planar sheets 322L, 322R, each having a selected thickness toward a corresponding targeted external lens surfaces 102, 104, spraying at a first selected spray aiming angle (e.g., spraying in a plane inclined proximally at an angle). The selected aiming angle can be in a range between 20° and 40° (as seen in FIG. 10A) relative to a plane parallel to the flange wall 306F, depending on the perpendicularity or angled orientation of the housing's bezel surface 306, supporting the lens external surfaces 302, 304. Nozzle head 320 is oriented to spray from a selected side, meaning that it is aimed to spray along a first selected spray azimuth angle in relation to a selected fixed reference point or datum 302D, 304D on each lenses perimeter. Distally projecting nozzle head 320 is positioned beside and aimed to spray along first and second spray axes 312L, 312R which each intersect (and so are aimed at) the center of corresponding distal objective lens surfaces 302, 304, so the first spray axis 312L from the nozzle head's first or left fluidic's outlet orifice is preferably aimed to intersect the left lens axis 302A and that spray 322L passes over the left lens peripheral edge at it's reference point or datum 302D. Similarly, the second spray axis 312R from the nozzle head's second or right fluidic's outlet orifice is preferably aimed to intersect the right lens axis 304A and that spray 322R passes over the left lens peripheral edge at it's reference point or datum 304D.

Preferably, the dual spray nozzle head includes a pair of fluidic circuit inserts (e.g., 170) each having an interaction chamber 172 configured to operate on a selectively actuated flow of pressurized washing fluid flowing through the inlet to generate an exhaust flow of fluid droplets (e.g., 322L, 322R), and the housing's fluid inlet 338 receives pressurized washer fluid and is in fluid communication with each fluidic's interaction chamber 172 which passes the pressurized washer fluid distally to the first and second laterally offset outlet nozzles (e.g., 174) which are each aimed toward the corresponding external lens surface and across the lenses fields of view. The preferred spray flow rate is approximately 200 ml/min per nozzle at 18 psi, and the spray thickness is preferably greater than 2 degrees. Thicker sprays may be selected for different nozzle head and lens placement configurations. The oscillating action and large drops generated by the fluidic oscillators aimed by nozzle head 320 in this manner were discovered to simultaneously wet lens surfaces very rapidly and provided a kinetic impact effect which was found to dislodge, dissolve and drive debris (not shown) as part of a flowing effluent laterally off bezel surface 106 (as seen in FIG. 10C).

Optionally, laterally offset low-profile washing nozzle head 330 may be configured as a non-oscillating shear nozzle configured to generate a substantially flat fan spray having a selected spray fan angle (e.g., 35°) the non-oscillating fan spray is less effective than the oscillating spray of droplets having a relatively uniform size and velocity. Alternatively, laterally offset low-profile washing nozzle head 320 may be configured as a non-oscillating bug-eye nozzle configured to generate at least one substantially solid fluid jet (i.e., a substantially solid fluid stream having no fan angle), which is also less effective than the oscillating sprays 322L, 322R illustrated in FIGS. 10C and 10D.

The integrated multi image sensor and lens washing nozzle assembly 300 illustrated in FIGS. 10A-10D is preferably is configured as an integrated automotive multi-camera module and nozzle assembly, with the multi-camera module and the aimed nozzle assembly 310 integrally packaged as a one-piece unitary module 300 configured for assembly into a vehicle 8. Each fluid impermeable camera module within housing 308 is enclosed behind and affixed within housing fixture bezel 306 and has an interior configured to enclose and aim an imaging sensor having an objective lens and a pixelated image sensor array (e.g., like 18), where bezel wall segment 306 may be transparent and define part of each camera's objective lens assembly.

It should be noted that the nozzle head's cavities 310C-L, 310C-R and first and second fluidic inserts (e.g., 170), although shown as substantially planar, may be arcuate, angled, or otherwise configured, depending upon the shape of nozzle head 320 and spray pattern desired. Likewise, oscillator channels may be defined in both the top and bottom surfaces of the insert or in the top and bottom walls of the cavity. The only limitation is that the fluidic oscillator, whichever surface or surfaces it is defined in, is sealed by the abutting surface(s) through the pressure exerted by the force fit within the housing's cavity.

Dual spray nozzle head 320 may be a three-piece configuration for nozzle assembly 310. Nozzle head 320 can include first and second cavities or sockets 310C-L, 310C-R (seen in FIG. 10B) and the cavity equipped nozzle head 320 thus constitutes one of the three main nozzle pieces. A pair of fluidic inserts or chips (e.g., 170) constitute the other two main pieces. If the nozzle head 320 includes at least one cavity to receive an insert 170, then a generally flat, planar floor surface defined in that cavity (e.g., 310C-R) terminates in a wide, generally rectangular opening defined in the lens-facing side surface of the housing's distally projecting enclosure. Internally, the fluid transporting lumen from inlet 338 is in fluid communication with the interior of nozzle head 320 and with a fluidic inlet supply channels or lumen which terminates in an opening in each cavity's sidewall surface (not shown). The fluid supply lumens communicate with the interior volume defined within each nozzle head cavity (e.g., 310C-R), and when pressurized fluid is pumped into and through the nozzle supply channel, that fluid flows into the cavity and into and through the fluidic (e.g., 170).

The fluidic insert or chip (e.g., 170) is a generally flat member adapted to be forced or pressed into the housing's cavity (e.g., 310C-R) and securely retained therein by the pressure exerted by the housing cavity walls on the insert. For this purpose the material from which the nozzle head 320 is fabricated is a solid plastic which deforms slightly under pressure. The cavity (e.g., 310C-R) has a top wall and bottom wall which are spaced by a distance substantially equal to the thickness of the insert (e.g., 170) between the insert top surface and bottom surface. Optionally, the bottom surface may somewhat bowed, making the insert somewhat thicker along its middle. The insert's sidewalls are likewise spaced by a distance substantially equal to the width of insert between its left and right side or lateral edges. In a preferred embodiment, fluidic circuit insert (e.g., 170) may be a few thousandths of an inch wider than the nozzle head's cavity. The insert and cavity may taper along their lengths, being wider at the forward end and narrowing toward the rearward end. The taper may be gradual or may be effected in plural discrete sections which are slightly angled toward one another.

Figure 11:
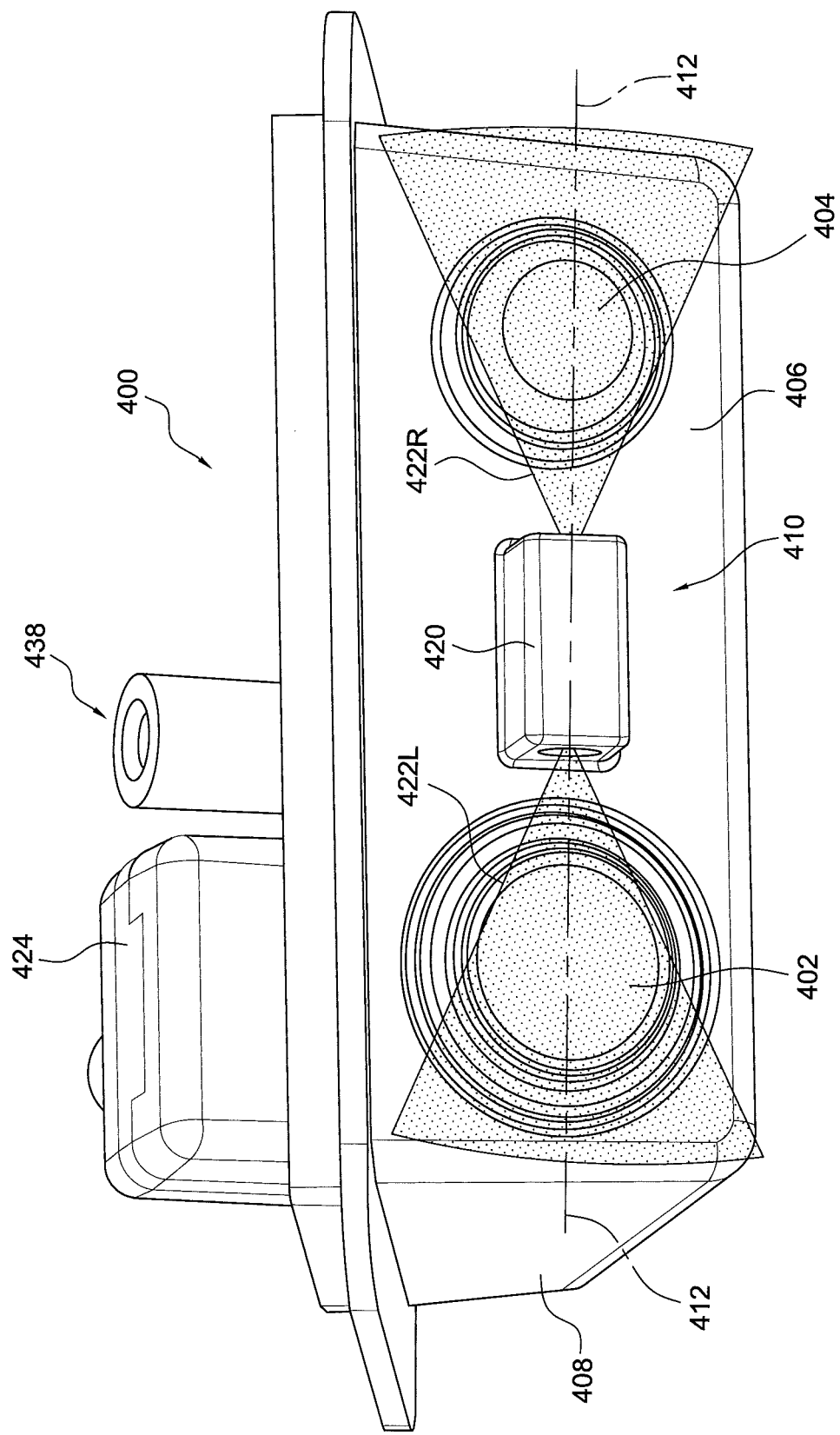
FIG. 11 is a perspective view, in elevation, of a third embodiment of the integrated multi image sensor and lens washing nozzle assembly, seen from the distal side of the housing cover or bezel, showing a dual spray nozzle assembly's spray head and showing that the first spray is symmetrically defined the first axis of symmetry or fluidic axis centered on the first fluidic's outlet or spray orifice and that the first fluidic's axis is aimed by the nozzle head to be substantially coaxial with the central axis of the first or left lens, and the second spray is symmetrically defined the same axis of symmetry or fluidic axis centered on the second fluidic's outlet or spray orifice and that the second fluidic's axis is aimed by the nozzle head to be substantially coaxial with the second spray axis which is centered on the second or right lens, in accordance with the present invention.

A third embodiment of the multi-lens washing system of the present invention is illustrated in FIG. 11. The third embodiment of the integrated multi image sensor and lens washing nozzle assembly 400 seen from the distal side of the housing cover or bezel 406, shows a dual spray nozzle assembly's spray head 420 directing or aiming a first spray 422L along a first axis of symmetry or fluidic axis 412 centered on the first fluidic's outlet or spray orifice and that the first fluidic's axis is aimed by the nozzle head 420 to be substantially coaxial with the central axis of the first or left lens 402. A second spray 422R is symmetrically defined the same axis of symmetry or fluidic axis 412 centered on the second fluidic's outlet or spray orifice and that the second fluidic's axis is aimed by nozzle head 420 to be substantially coaxial with the second spray axis which is centered on the second or right lens 404, in accordance with the present invention.

Integrated multi image sensor and lens washing center-spray nozzle assembly 400 is configured as a multi-camera (or other image sensor) module 400 for a vehicle and is provided with multiple sensors, each of which is covered by a corresponding objective lens cover or external surface such as a generally flat lens cover 402 and a dome, or "fish-eye" lens cover 404, mounted or molded in-situ in a substantially planar housing segment or bezel 406 which, in turn, is securable to a sensor enclosure or housing enclosure 408 on or in a vehicle surface in the manner described above. The unitary module 400 of the invention further includes a central nozzle assembly 410 mounted on or molded within the housing cover 406 and configured to direct first and second controlled fluid washer sprays in opposing directions to clean the laterally spaced, aligned first and second lens covers 402, 404 that are also mounted in or carried on the housing's planar external surface 406. It will be understood that the illustrated lens covers 402 and 404 preferably are protective covers for the lenses of respective sensors mounted in the housing enclosure 408; however, in some cases the exterior surfaces of sensor lens elements may be secured in or extending above the top surface of the housing cover, as when the sensors are mounted directly to the interior of the housing's cover or bezel 406.

For convenience of reference herein, each of the objective lens or optical elements 402 and 404 may be interchangeably referred to as a lens or a lens cover (as with the examples described above). The multiple lenses or lens covers may be parts of or covers for different types of sensors, such as an infrared sensor for lens 402 and a video camera for lens 404, or the sensors may be of the same type, with different lenses providing different fields of view. In addition, although two lenses are illustrated, it will be understood that additional lenses, or lens covers, may be mounted on the housing and aligned with the two illustrated lenses for simultaneous cleaning.

The multiple lenses 402 and 404 and the nozzle assembly 410 are aligned along axis 412 and laterally offset from each other along the width of the substantially planar distal surface of cover or bezel 406, to provide an integrated, compact sensor and lens cleaner package or unitary module 400 that meets the needs of today's vehicle designs, where more and more sensors are being used to provide drivers with enhanced visibility and to enable improved vehicle control and automation. The lens cleaner system of the invention arranges the lens and nozzle components to provide simple and effective simultaneous cleaning of multiple lenses by a single nozzle assembly by optimizing the height and spacing of the lenses or lens covers with respect to each other and with respect to the nozzle assembly to produce an efficient cleaning operation.

The centered, dual spray fluidic nozzle assembly 410 is located in the central portion of housing cover surface or bezel 106, and incorporates a nozzle spray head 120 preferably including a first and second oscillator circuits (e.g., 170). The centered dual spray nozzle assembly 110 is mounted on or affixed within the housing cover 106 and configured to aim and generate first and second fan-shaped oscillating sprays 422L and 422R which are aimed in opposing directions along spray axis 412 to simultaneously clean the exterior surfaces of the lens covers 402 and 404. Housing 408 preferably encloses at least two image sensor units (e.g., 124 and 126), which may be conventional automotive infrared or video camera sensors having lenses which correspond to and are preferably located behind protective covers or objective lens external surfaces 402 and 404, respectively. The sensor units are connected through corresponding cables (e.g., 128 and 130) to suitable displays and/or controls, as is conventional in the art, to allow a vehicle's driver, user or operator to use the interior display to determine whether external-view camera objective lens surfaces or covers 402 or 404 are occluded by or covered with accumulated debris (e.g., accumulated dirt, dust, mud, road salt or other built-up debris, not shown).

Centered dual spray nozzle head 420 may be configured with first and second opposing cavities, each configured to receive a corresponding fluidic circuit insert or chip (e.g., 170) and provide fluid communication between each fluidic's inlet 178 and module inlet or barb 438. As best seen in FIGS. 11 and 8A, the fluidic circuit's features are symmetrically defined about an axis of symmetry or fluidic axis 177 centered on the fluidic's outlet or spray orifice 174 and for each of the dual spray fluidics, its fluidic axis 177 is oriented and aimed by nozzle head 420 to be substantially coaxial with spray axis 412, to wash the corresponding lens surface, as described above.

The integrated multi image sensor and lens washing nozzle assembly 400 illustrated in FIG. 11 is preferably is configured as an integrated automotive multi-camera module and nozzle assembly, with the multi-camera module and the centered dual spray nozzle assembly 410 is integrally packaged as a one-piece unitary module 400 configured for assembly into a vehicle 8. Each fluid impermeable camera module within housing 408 is enclosed behind and affixed within housing fixture bezel 406 and has an interior configured to enclose and aim an imaging sensor having an objective lens and a pixelated image sensor array (e.g., like 18), where bezel wall segment 406 may be transparent and define part of each camera's objective lens assembly.

It should be noted that the nozzle head's cavities and first and second fluidic inserts (e.g., 170), although shown as substantially planar, may be arcuate, angled, or otherwise configured, depending upon the shape of nozzle head 420 and spray pattern desired. Likewise, oscillator channels may be defined in both the top and bottom surfaces of the insert or in the top and bottom walls of the cavity. The only limitation is that the fluidic oscillator, whichever surface or surfaces it is defined in, is sealed by the abutting surface(s) through the pressure exerted by the force fit within the housing's cavity.

Having described preferred embodiments of a new and improved lens cleaning system and method, it is believed that other modifications, variations and changes will be suggested to those skilled in the art in view of the teachings set forth herein. It is therefore to be understood that all such variations, modifications and changes are believed to fall within the scope of the present invention.

What is claimed is:

1. An integrated image sensor support and lens cleaning system configured for use on a vehicle's exterior surface, comprising:

a planar bezel or housing member having a substantially planar distal or external surface;

said bezel including a first image sensor having an external image sensing surface and a second image sensor having a second external image sensing surface, wherein said first image sensor's external surface and said second image sensor's external surface are incorporated integrally into or supported by said bezel's substantially planar distal or external surface;

a single nozzle assembly carried on or molded into projecting distally from said bezel's external surface and to one side of said first and second image sensors' external surfaces, said nozzle assembly incorporating a distally projecting spray head having at least one fluid outlet nozzle having an aperture directing a controlled fluid spray outwardly along a spray axis toward and across said first and second image sensors' external surfaces;

said nozzle assembly being configured with its outlet orifice or aperture aimed and oriented at a height above said first and second image sensors' external surfaces and spaced from said first and second image sensors' external surfaces to cause said fluid spray to be ejected from said spray head orifice along said spray axis to strike said first and second image sensors' external surfaces substantially simultaneously at angles selected to produce fluid effects at said first and second image sensors' external surfaces that enhance the cleaning effect of the fluid on said first and second image sensors' external surfaces;

wherein said nozzle assembly's spray head includes a first fluidic oscillator to generate an oscillating spray of droplets from said nozzle assembly's outlet orifice or aperture, and wherein said outlet orifice and said first and second image sensors' external surfaces are aligned along a common spray axis, and wherein fluid sprayed from said outlet orifice grazes across a first lens surface nearest to said outlet orifice and impacts a second lens surface spaced farthest away from said outlet orifice.

2. The integrated image sensor support and lens cleaning system of claim 1, wherein said spray head incorporates two outlet orifices, each directing a selected spray pattern toward said first and second image sensors' external surfaces.

3. The integrated image sensor support and lens cleaning system of claim 1, wherein the shape and spacing of said first and second image sensors' external surfaces are selected to cooperate with the fluid spray from said outlet orifice to produce fluid effects at the first and second image sensors' external surfaces to enhance cleaning of the first and second image sensors' external surfaces.

4. The integrated image sensor support and lens cleaning system of claim 3, wherein said fluid spray maintains a fan shape while washing over the nearest or first lens and then continues and impacts the farther or second lens, and attaches to the second lens and flows around the surface of second lens.

5. The integrated image sensor support and lens cleaning system of claim 1, wherein said nozzle assembly is configured to generate a 'thick' spray, where the spray's thickness is tuned to best achieve cleaning for the said first and second image sensors' external surfaces aligned along the spray axis.

6. The integrated image sensor support and lens cleaning system of claim 1, wherein said nozzle assembly is configured to generate a double spray, where the double spray comprises an upper spray and a lower spray; wherein said upper spray's fan angle and thickness are tuned to best achieve cleaning for the said second image sensors' external surface; and wherein said lower spray's fan angle and thickness are tuned to best achieve cleaning for the said first image sensors' external surface, wherein said upper and lower sprays are each aligned along the spray axis.

7. The integrated image sensor support and lens cleaning system of claim 1, wherein said nozzle assembly spray head's fluidic oscillator's interaction chamber has an inlet or fluid feed configured to operate on a selectively actuated flow of pressurized washing fluid flowing through the oscillator's interaction chamber to generate an exhaust flow of fluid droplets as spray projecting distally through said outlet spray orifice, said oscillator being supported with the oscillator's orifice centered on the spray axis.

8. The integrated image sensor support and lens cleaning system of claim 7, wherein said fluidic oscillator has an inlet in fluid communication with at least a pair of power nozzles configured to accelerate the movement of pressurized fluid that flows through said power nozzles so as to form a jet of fluid that flows from each said power nozzle, all being part of a fluid channel pathway that connects and allows for the flow of said fluid between said inlet and said power nozzles;

wherein said fluid channel pathway is defined between boundary surfaces that include a pair of sidewalls, said interaction chamber attached to said nozzles and which receives said jet flows from said nozzles, wherein said outlet orifice exhausts spray from said interaction chamber, and wherein said fluid channel pathway also includes a flow instability inducing feature configured to increase the instability of said flow from said power nozzles, said flow instability inducing feature being configured within said pathway at a location upstream of said power nozzles.

9. The integrated image sensor support and lens cleaning system of claim 8, wherein said flow instability inducing feature comprises a pair of protrusions that extend inward from said fluid pathway boundary surface, said protrusions configured to cause a flow separation region downstream of said protrusions.

10. The integrated image sensor support and lens cleaning system of claim 8, wherein said flow instability inducing feature comprises a protrusion that extends inward from each said sidewall of said pathway, said protrusions configured to cause a flow separation region downstream of said protrusions.

11. The integrated image sensor support and lens cleaning system of claim 8, wherein said flow instability inducing feature comprises a step discontinuity or change in the floor depth configured to cause a flow separation region downstream of said flow instability inducing feature.

12. The compact, low-profile nozzle assembly of claim 1, wherein said fluidic oscillator is configured to generate an oscillating spray of high velocity fluid droplets which impact said external objective lens surface at a shallow angle and wherein said oscillating spray washes and across said image sensor's entire field of view to remove soil, grime and obstructions from said objective lens surface.

13. The integrated image sensor support and lens cleaning system of claim 1, wherein said bezel's external surface is substantially parallel with the spray axis and defines a unitary housing bezel and transparent objective lens cover surface, and wherein said nozzle fluid outlet is aimed to spray washing fluid along said objective lens cover surface and simultaneously onto said first image sensor's external surface and said second image sensor's external surface at a narrow, glancing angle, said spray being aimed across said first and second image sensors' field of view along an aiming angle which is selected to be within the range bounded by 1° and 20° in relation to said first and second image sensors' external surfaces.

14. The integrated image sensor support and lens cleaning system of claim 13, wherein said selected spray aiming angle is about 1°.

15. An integrated image sensor support and lens cleaning system configured for use on a vehicle's exterior surface, comprising:

a housing including a planar bezel or housing member having a substantially planar distal or external surface and a transverse flange wall projecting from said housing in a plane which is substantially transverse to the plane of said housing's bezel;

said bezel including a first image sensor having an external image sensing surface and a second image sensor having a second external image sensing surface, wherein said first image sensor's external surface and said second image sensor's external surface are incorporated integrally into or supported by said bezel's substantially planar distal or external surface;

a single nozzle assembly carried on or molded into projecting distally from an external surface of said flange wall and to one side of said first and second image sensors' external surfaces, said nozzle assembly incorporating a distally projecting spray head having first and second fluid outlet nozzles having an first and second outlet orifice apertures directing first and second controlled fluid sprays along first and second corresponding spray axes toward and across said first and second image sensors' external surfaces;

said nozzle assembly being configured with each of said first and second outlet orifices aimed and oriented at a height above said first and second image sensors' external surfaces and spaced from said first and second image sensors' external surfaces to cause said fluid sprays to be ejected from said first and second spray head orifices along said first and second spray axes to strike said first and second image sensors' external surfaces substantially simultaneously at angles selected to produce fluid effects at said first and second image sensors' external surfaces that enhance the cleaning effect of the fluid on said first and second image sensors' external surfaces;

wherein said nozzle assembly's spray head includes a first fluidic oscillator to generate an oscillating spray of droplets from said nozzle assembly's outlet orifice or aperture, and wherein said first outlet orifice and said first image sensors' external surface are aligned along a first spray axis, and wherein fluid sprayed from said first outlet orifice impacts said a first lens surface and flows over and past said first lens surface.

16. The integrated image sensor support and lens cleaning system of claim 15, wherein the shape and spacing of said first and second image sensors' external surfaces are selected to cooperate with the first and second fluid sprays from said first and second outlet orifices to produce fluid effects at the first and second image sensors' external surfaces to enhance cleaning of the first and second image sensors' external surfaces.

17. An integrated image sensor support and lens cleaning system configured for use on a vehicle's exterior surface, comprising:
a planar bezel or housing member having a substantially planar distal or external surface;
said bezel including a first image sensor having an external image sensing surface and a second image sensor having a second external image sensing surface, wherein said first image sensor's external surface and said second image sensor's external surface are incorporated integrally into or supported by said bezel's substantially planar distal or external surface;
a single dual spray nozzle assembly carried on or molded into projecting distally from said bezel's external surface and to one side of said first and second image sensors' external surfaces, said nozzle assembly incorporating a distally projecting dual spray nozzle head having at least first and second fluid outlet nozzle having first and second apertures directing first and second controlled fluid sprays outwardly along a spray axis toward and across said first and second image sensors' external surfaces;
said nozzle assembly being configured with each of said first and second outlet orifices or apertures aimed and oriented at a height above said first and second image sensors' external surfaces and spaced from said first and second image sensors' external surfaces to cause said first and second fluid sprays to be ejected from said spray head orifice in opposing directions along said spray axis to strike said first and second image sensors' external surfaces substantially simultaneously at angles selected to produce fluid effects at said first and second image sensors' external surfaces that enhance the cleaning effect of the fluid on said first and second image sensors' external surfaces;
wherein said nozzle assembly's spray head includes first and second fluidic oscillators each configured and aimed to generate an oscillating spray of droplets from said nozzle assembly's first and second outlet orifices or apertures, and
wherein said first and second outlet orifices and said first and second image sensors' external surfaces are aligned along a common spray axis, and wherein fluid sprayed from each outlet orifice impacts its corresponding lens surface.

18. The integrated image sensor support and lens cleaning system of claim 17, wherein the shape and spacing of said first and second image sensors' external surfaces are selected to cooperate with the first and second fluid sprays from said first and second outlet orifices to produce fluid effects at the first and second image sensors' external surfaces to enhance cleaning of the first and second image sensors' external surfaces.

19. An integrated image sensor support and lens cleaning system configured for use on a vehicle's exterior surface, comprising:
a housing including a planar bezel or housing member having a substantially planar distal or external surface;
said bezel including a first image sensor having an external image sensing surface and a second image sensor having a second external image sensing surface wherein said first image sensor's external surface and said second image sensor's external surface are incorporated integrally into or supported by said bezel's substantially planar distal or external surface;
a single nozzle assembly carried on or molded into said housing projecting from said housing's external surface and to one side of said first and second image sensors' external surfaces, said nozzle assembly incorporating a spray head having at least one fluid outlet nozzle having an aperture or outlet orifice directing a controlled fluid spray outwardly along a spray axis toward and across at least one of said first and second image sensors' external surfaces;
said nozzle assembly being configured with its aperture or outlet orifice aimed and oriented at a height above at least one of said first and second image sensors' external surfaces and spaced from at least one of said first and second image sensors' external surfaces to cause at least one of said fluid sprays to be ejected from said spray head orifice along said spray axis to strike at least one of said first and second image sensors' external surfaces substantially simultaneously at angles selected to produce fluid effects upon at least one of said first and second image sensors' external surfaces that enhance the cleaning effect of the fluid on at least one of said first and second image sensors' external surfaces;
wherein said nozzle assembly's spray head includes a first fluidic oscillator to generate an oscillating spray of droplets from said nozzle assembly's outlet orifice or aperture, and
wherein said first outlet orifice and said first image sensors' external surface are aligned along a first spray axis, and wherein fluid sprayed from said first outlet orifice impacts said a first lens surface and flows over and past said first lens surface.

* * * * *